United States Patent
Yoon et al.

(10) Patent No.: US 12,330,655 B2
(45) Date of Patent: Jun. 17, 2025

(54) TRACTION CONTROL METHOD FOR VEHICLE

(71) Applicants: Hyundai Motor Company, Seoul (KR); Kia Corporation, Seoul (KR)

(72) Inventors: Ye Ahn Yoon, Hwaseong-Si (KR); Dong Hyun Kim, Pyeongtaek-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 206 days.

(21) Appl. No.: 18/222,266

(22) Filed: Jul. 14, 2023

(65) Prior Publication Data

US 2024/0199027 A1 Jun. 20, 2024

(30) Foreign Application Priority Data

Dec. 15, 2022 (KR) .................. 10-2022-0175537

(51) Int. Cl.
*B60W 30/18* (2012.01)
*B60W 10/08* (2006.01)
*B60W 50/00* (2006.01)

(52) U.S. Cl.
CPC ...... *B60W 30/18172* (2013.01); *B60W 10/08* (2013.01); *B60W 2050/0026* (2013.01); *B60W 2050/0056* (2013.01); *B60W 2520/26* (2013.01); *B60W 2520/28* (2013.01)

(58) Field of Classification Search
CPC ........... B60W 30/18172; B60W 10/08; B60W 2050/0026; B60W 2050/0065; B60W 2520/26; B60W 2520/28
See application file for complete search history.

(56) References Cited

U.S. PATENT DOCUMENTS

| 2002/0107106 | A1 | 8/2002 | Kato et al. |
| 2009/0242289 | A1* | 10/2009 | Murty ............... B60W 10/08 475/5 |
| 2014/0148307 | A1* | 5/2014 | Severinsson ........ B60W 10/16 477/20 |
| 2015/0175009 | A1 | 6/2015 | Beever et al. |
| 2021/0009129 | A1* | 1/2021 | Obergünner ........ B60W 10/08 |
| 2021/0207698 | A1* | 7/2021 | Ahn ............... B60W 30/18145 |
| 2022/0349459 | A1* | 11/2022 | Scalici ............. B60K 17/165 |

(Continued)

FOREIGN PATENT DOCUMENTS

| JP | 1995-257349 A | 10/1995 |
| JP | 2017-114313 A | 6/2017 |

(Continued)

*Primary Examiner* — George C Jin
(74) *Attorney, Agent, or Firm* — Morgan, Lewis & Bockius LLP

(57) ABSTRACT

A traction control method for a vehicle, in which a driving motor and a torque vectoring motor are controlled based on motor traction control torque, includes determining, by a disturbance observer based on a vehicle model, observer torque based on the slipping wheel actual speed and a torque vectoring motor torque, which are feedback information obtained from a vehicle in which the driving motor and the torque vectoring motor are controlled, and determining torque vectoring motor traction control torque based on the determined observer torque and a speed control torque determined based on a torque-vectoring-motor-based wheel speed error among motor-based wheel speed errors.

20 Claims, 10 Drawing Sheets

(56) References Cited

U.S. PATENT DOCUMENTS

| | | | |
|---|---|---|---|
| 2023/0077890 A1* | 3/2023 | Verbridge | B60W 50/08 |
| | | | 475/5 |
| 2023/0294703 A1* | 9/2023 | Mandery | B60K 1/02 |
| | | | 701/22 |
| 2024/0123995 A1* | 4/2024 | Yoon | B60W 50/10 |

FOREIGN PATENT DOCUMENTS

| | | |
|---|---|---|
| JP | 2019-031112 A | 2/2019 |
| JP | 2021-191194 A | 12/2021 |
| KR | 10-1343226 B | 12/2013 |

\* cited by examiner

TRACTION CONTROL METHOD FOR VEHICLE

CROSS-REFERENCE TO RELATED APPLICATION

The present application claims priority to Korean Patent Application No. 10-2022-0175537 filed on Dec. 15, 2022, the entire contents of which is incorporated herein for all purposes by this reference.

BACKGROUND OF THE PRESENT DISCLOSURE

Field of the Present Disclosure

The present disclosure relates to a traction control method for a vehicle. More particularly, it relates to a traction control method for a vehicle, which enables a vehicle provided with a torque vectoring (TV) device to escape from a split-p situation without loss of driving force using a torque vectoring (TV) motor.

Description of Related Art

As an electronic control system for improving safety while driving of a vehicle, an electronic stability control (ESC) system for keeping the vehicle attitude stable is generally known.

The ESC system is a system for securing stability of a vehicle while driving or braking of the vehicle by operating an anti-lock brake system (ABS), which prevents brake lock due to wheel slip on a slippery road surface during braking of the vehicle, and a traction control system (TCS), which prevents wheel slip by controlling driving force or braking force upon sudden start or sudden acceleration of the vehicle.

The TCS is an active safety device that prevents excessive slip of a driving wheel when the vehicle starts or accelerates on a low-friction road surface or an asymmetric road surface, preventing vehicle spin and improving the start and acceleration performance and the steering stability of the vehicle.

When a phenomenon such as wheel slip occurs due to generation of excessive driving force when the vehicle starts or accelerates on a slippery road, the TCS controls the driving force (driving torque) or the braking force (braking torque) of the vehicle to control the speed of the driving wheel and to thereby maximize the acceleration of the vehicle.

Here, the driving force of the vehicle may be torque output from the driving source of the vehicle. The driving source of the vehicle may be a motor (in the case of a pure electric vehicle or a fuel cell vehicle) or an engine (in the case of an internal combustion engine vehicle), or may be composed of a motor and an engine (in the case of a hybrid vehicle).

For example, in a motor-driven vehicle such as a pure electric vehicle, a fuel cell vehicle, or a hybrid vehicle, the TCS determines a target speed of the driving wheel, at which driving force is optimized, based on the amount of slip of the driving wheel on the road surface and the coefficient of friction of the road surface, and controls the motor torque to follow the target speed. Furthermore, when the vehicle turns a corner, the TCS reduces the motor torque to keep the vehicle stable, allowing the vehicle to turn safely.

Furthermore, handling performance of the vehicle has recently been improved using various chassis control technologies. A representative method of improving handling performance is torque vectoring (TV) control technology.

A device for performing torque vectoring, i.e., a torque vectoring apparatus, independently and freely adjusts the amount of torque transmitted to left and right wheels to improve the agility and handling performance of the vehicle.

Here, the torque includes both driving torque, which is typically defined as positive (+) torque acting in a direction of accelerating the vehicle, and braking torque, which is typically defined as negative (−) torque acting in a direction of decelerating the vehicle.

Torque vectoring is technology for representing both the magnitude and the direction of output or driving force transmitted to the driving wheel from the driving source (the motor, the engine, or both the motor and the engine) and changing the magnitude and the direction of the torque transmitted to the wheel, to each of the left and right wheels on the same axle axis.

Furthermore, an electrified vehicle provided with an electrified powertrain apparatus including a motor, i.e., a motor-driven vehicle (including a hybrid vehicle) that travels using a motor, employs technology for implementing torque vectoring using the driving source and the brake of the vehicle. Here, the brake refers to a wheel brake which is a friction braking device (typically, a hydraulic braking device) configured to apply braking force to the wheel.

A road in which the coefficient of friction p of the road surface with which the left wheel of the vehicle is in contact and the coefficient of friction p of the road surface with which the right wheel of the vehicle is in contact are different from each other is referred to as a split road, and a situation in which the vehicle travels on a split road is referred to as a split-p situation. That is, a situation in which a road on which the vehicle is currently traveling is a split road is a split-p situation.

When torque is applied to driving wheels to start the vehicle on a split road, the torque is also transmitted to a wheel on a road surface having a low coefficient of friction through a differential of the vehicle, which causes the wheel to slip excessively.

Furthermore, in the case of a vehicle provided with an open differential (OD), if the driving force of the engine or the motor exceeds the limit of frictional force determined by the static coefficient of friction or the kinetic coefficient of friction of a wheel on a slippery road surface in the leftward-rightward split-p situation, driving force equivalent to the frictional force is also transmitted to the grounded wheel, which is a wheel opposite to the slipping wheel, due to the mechanical characteristics of the open differential, and the remaining driving force is transmitted to the wheel on the slippery road surface, thus causing slip of the wheel. In the instant case, if the frictional force of the slippery road surface is less than the static frictional force or the kinetic frictional force of the ground wheel, acceleration of the vehicle is impossible.

The conventional TCS or ESC reduces driving torque to keep the vehicle stable on a split road, and applies braking torque to a wheel that slips on a slippery road surface (hereinafter referred to as a "slipping wheel") to control the speed of the slipping wheel in the split-p situation. In the instant case, driving force equivalent to reaction torque generated by the braking torque may be transmitted to a grounded wheel through an open differential. As a result, the driving force overcomes the static frictional force or the kinetic frictional force of the grounded wheel, and enables the vehicle to escape from the split-p situation.

However, in the present situation, the driving force of the vehicle is absorbed and canceled by the amount equivalent to the braking torque, and thus the starting performance of the vehicle is degraded. Furthermore, in a process of controlling the braking torque to keep the vehicle stable, initial wheel slip is not effectively suppressed due to slow responsiveness of the hydraulic braking device, and thus driving of the vehicle becomes unstable, or driving discomfort occurs due to the braking torque.

Alternatively, an electronic limited slip differential (e-LSD) may be used to block transmission of driving force to a slipping wheel and transmit driving force to a grounded wheel. In the instant case, because the driving force is transmitted to the grounded wheel without loss of the driving force, the vehicle may escape from the split-p situation. However, the control using the e-LSD necessarily requires control of a clutch hydraulic actuator, and thus the response speed of the control is slow compared to control of a motor.

Furthermore, according to a conventional traction control method using PID speed control, it is necessary to repeatedly perform tests on various road surfaces to secure robust control performance against disturbance which is difficult to estimate. Furthermore, it is impossible to achieve robust control in an environment that has not been tested, and thus performance tuning is conservatively performed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a traction control method for a vehicle, which enables a vehicle provided with a torque vectoring apparatus to escape from a split-p situation without loss of driving force using a torque vectoring motor.

Various aspects of the present disclosure are directed to providing a traction control method for a vehicle, which is configured for securing robust speed control performance against disturbance.

The objects of the present disclosure are not limited to the above-mentioned objects, and other objects not mentioned herein will be clearly understood by those skilled in the art from the following description.

Various aspects of the present disclosure are directed to providing a traction control method for a vehicle, including estimating, by a controller, a wheel speed based on a rotation speed of a vehicle driving system or a vehicle acceleration detected by an acceleration sensor and determining a slipping wheel target speed based on the estimated wheel speed in the state in which traction control is entered in the vehicle provided with a torque vectoring motor, determining, by the controller, a wheel speed error based on the determined slipping wheel target speed and a slipping wheel actual speed detected by a wheel speed sensor and determining motor-based wheel speed errors based on the determined wheel speed error, determining, by the controller, motor traction control torque based on the determined motor-based wheel speed errors and driver's requested torque, and controlling, by the controller, a driving motor to drive the vehicle and the torque vectoring motor based on the determined motor traction control torque. The determining of the motor traction control torque includes determining, by a disturbance observer based on a vehicle model, observer torque based on the slipping wheel actual speed and a torque vectoring motor torque, which are feedback information obtained from the vehicle in which the driving motor and the torque vectoring motor are controlled, and determining torque vectoring motor traction control torque based on the determined observer torque and a speed control torque determined based on a torque-vectoring-motor-based wheel speed error among the determined motor-based wheel speed errors.

Other aspects and exemplary embodiments of the present disclosure are discussed infra.

It is understood that the term "vehicle" or "vehicular" or other similar term as used herein is inclusive of motor vehicles in general such as passenger vehicles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the present disclosure are discussed infra.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
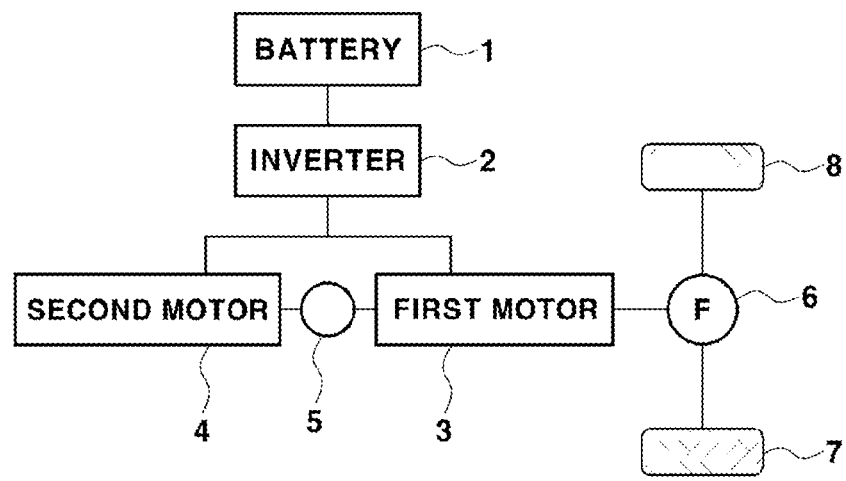
FIG. 1, FIG. 2, and FIG. 3 are diagrams illustrating a hardware configuration of an electric torque vectoring apparatus which may be used in an exemplary embodiment of the present disclosure.

It should be understood that the appended drawings are not necessarily to scale, presenting a somewhat simplified representation of various exemplary features illustrative of the basic principles of the present disclosure. The specific design features of the present disclosure as included herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Various exemplary embodiments will now be described more fully with reference to the accompanying drawings, in which only some exemplary embodiments are shown. Specific structural and functional details included herein are merely representative for describing exemplary embodiments of the present disclosure. The present disclosure, however, may be embodied in many alternate forms, and should not be construed as being limited only to the exemplary embodiments set forth herein. Accordingly, while exemplary embodiments of the present disclosure are capable of being variously modified and taking alternative forms, embodiments thereof are shown by way of example in the drawings and will herein be described in detail. It should be understood, however, that there is no intent to limit the present disclosure to the exemplary embodiments disclosed. On the other hand, various exemplary embodiments are to cover all modifications, equivalents, and alternatives falling within the scope of the present disclosure.

It will be understood that, although the terms "first", "second", etc. may be used herein to describe various elements, these elements should not be limited by these terms. These terms are only used to distinguish one element from another. For example, a first element could be termed a second element, and similarly, a second element could be termed a first element, without departing from the scope of the exemplary embodiments of the present disclosure.

It will be understood that when an element is referred to as being "connected" or "coupled" to another element, it may be directly connected or coupled to the other element, or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

Wherever possible, the same reference numbers will be used throughout the drawings to refer to the same or like parts. The terminology used herein is for describing various exemplary embodiments only and is not intended to be limiting of exemplary embodiments of the present disclosure. As used herein, the singular forms "a", "an", and "the" are intended to include the plural forms as well, unless the context clearly indicates otherwise. It will be further understood that the terms "comprises", "comprising", "includes", and/or "including", when used herein, specify the presence of stated components, steps, operations, and/or elements, but do not preclude the presence or addition of one or more other components, steps, operations, and/or elements.

Various embodiments of the present disclosure relates to a traction control method for a vehicle including a torque vectoring (TV) device. The torque vectoring apparatus may be an electric torque vectoring apparatus, and the electric torque vectoring apparatus may include a torque vectoring (TV) motor. Furthermore, the present disclosure may be applied to a vehicle provided with an open differential (OD).

In an exemplary embodiment of the present disclosure, traction control may be performed using an electric torque vectoring apparatus, and the electric torque vectoring apparatus used for traction control may be a known torque vectoring apparatus including a known hardware configuration.

Figure 2:
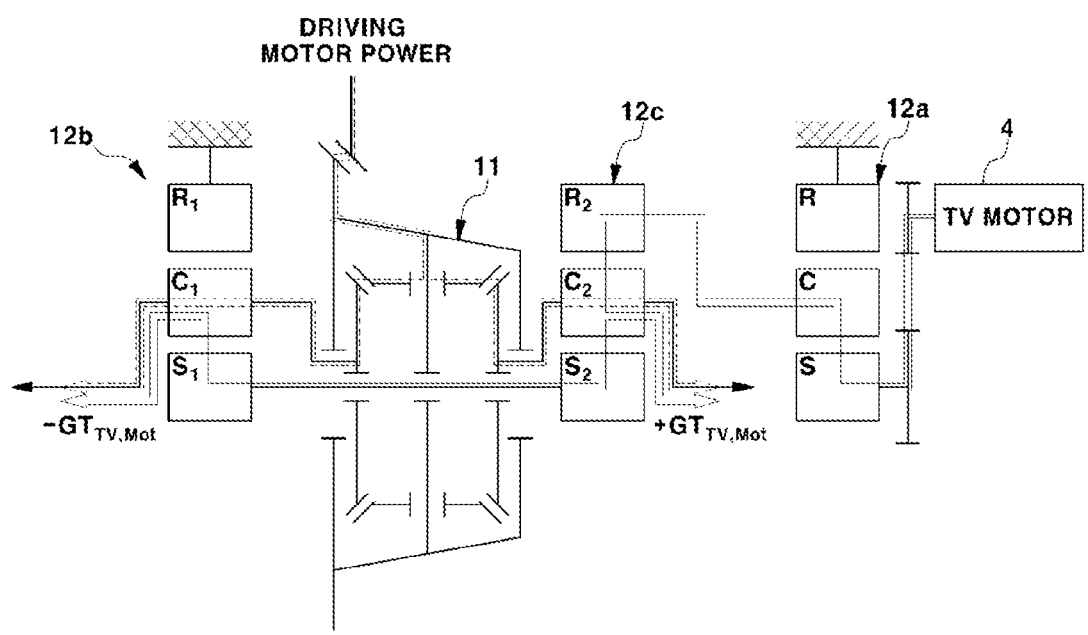
Figure 3:
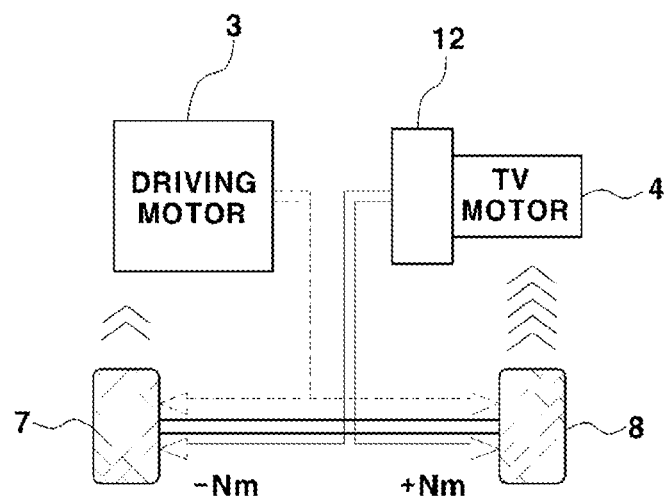

FIG. 1, FIG. 2, and FIG. 3 illustrate a hardware configuration of an electric torque vectoring apparatus which may be used in an exemplary embodiment of the present disclosure. In the example in FIG. 1, a first motor 3 is a driving motor for driving a vehicle, and a second motor 4 is a motor which may be used as a torque vectoring motor. Hereinafter, the torque vectoring motor will be referred to as a "TV motor."

Referring to FIG. 1, a battery 1 is connected to the first motor 3, which is a driving motor, and the second motor 4, which is a TV motor, via an inverter 2 to be rechargeable, and the first motor 3 and the second motor 4 operate using power received from the battery 1 through the inverter 2.

Furthermore, the first motor 3 and the second motor 4 are connected to driving wheels of the vehicle, i.e., a left wheel 7 and a right wheel 8, to transmit driving force thereto. The vehicle may be driven and travel using torqued applied to the left wheel 7 and the right wheel 8 from the first motor 3 and the second motor 4.

Furthermore, a torque vectoring mechanism 5, in which planetary gear sets are combined, is connected to the output side of the second motor 4, which is a TV motor. The torque of the second motor 4 is distributed and applied to the left wheel and the right wheel through the torque vectoring mechanism 5, whereby torque vectoring may be performed.

The inverter 2 is a device configured for driving and controlling the first motor 3 and the second motor 4. When a vehicle control unit (VCU) (denoted by reference numeral 20 in FIG. 4) generates a motor torque command based on vehicle driving information connected in real time and outputs the motor torque command, a motor control unit (MCU) (denoted by reference numeral 40 in FIG. 4) drives the inverter 2 in response to the motor torque command output from the vehicle control unit.

Furthermore, when the power of the battery 1 is applied to the motors 3 and 4 through the inverter 2, the direct current of the battery is converted into three-phase alternating current by the inverter, which operates in response to the motor torque command, and the three-phase alternating current is applied to the motor, so that the corresponding motor outputs torque.

The torque output from the motor is applied to the left wheel 7 and the right wheel 8 through a reducer or a transmission and a differential 6. Illustration of the reducer or the transmission is omitted from FIG. 1.

When the vehicle is a hybrid vehicle, an engine clutch may be disposed between an engine and a driving motor, and a transmission may be mounted on the output side of the driving motor.

In a hybrid vehicle in which a transmission is disposed on the output side of a driving motor, i.e., a transmission mounted electric device (TMED) type hybrid vehicle, a starter-generator directly connected to an engine to transmit power to the engine, i.e., a hybrid starter and generator (HSG), may be used as the second motor, which is a torque vectoring motor.

As illustrated in FIG. 2, the torque vectoring apparatus may be configured so that a differential 11, to which power of the driving motor (the first motor) is transmitted through a reducer, the TV motor (the second motor) 4, and a plurality of planetary gear sets 12a, 12b, and 12c, which are disposed between the TV motor 4 and the driving wheels, are combined.

In the driving system illustrated in FIG. 2, the plurality of planetary gear sets may include a first planetary gear set 12a disposed on the output side of the TV motor 4, a second planetary gear set 12b disposed between the differential 11 and the left wheel, and a third planetary gear set 12c disposed between the first planetary gear set 12a, the right wheel, and the differential 11.

FIG. 3 is a diagram for explaining the state of torque transmitted to the left wheel 7 and the right wheel 8 by the driving motor 3 and the TV motor 4. It may be seen that a torque vectoring mechanism 12, which is a power transmission mechanism including planetary gear sets, is disposed on the output side of the TV motor 4.

In an example in which a differential, a TV motor, and a plurality of planetary gear sets are combined to form the vehicle torque vectoring apparatus, if the rear wheels are driving wheels, the torque transmitted to the left-rear wheel 7 and the torque transmitted to the right-rear wheel 8 may be expressed using Equations 1 and 2 below.

$$T_{RL} = \tfrac{1}{2} \times A \times T_{main,Mot} + G \times T_{TV,Mot} \quad \text{[Equation 1]}$$

$$T_{RR} = \tfrac{1}{2} \times A \times T_{main,Mot} - G \times T_{TV,Mot} \quad \text{[Equation 2]}$$

Here, $T_{RL}$ represents torque applied to the left-rear wheel 7 (left-rear wheel torque), $T_{RR}$ represents torque applied to the right-rear wheel 8 (right-rear wheel torque), and $T_{TV,Mot}$ represents torque output from the TV motor 4 (TV motor torque).

Furthermore, A represents a rear motor gear ratio, and B represents a TV motor gear ratio.

In the instant case, a TV motor speed may be expressed using Equation 3 below.

$$N_{TV} = G \times (N_{RL} - N_{RR}) \quad \text{[Equation 3]}$$

Here, $N_{TV}$ represents a TV motor speed, $N_{RL}$ represents a left-rear wheel speed, and $N_{RR}$ represents a right-rear wheel speed.

Referring to the example in FIG. 3, the torque of the TV motor 4 is transmitted to the right wheel as positive torque +Nm (torque acting in the driving direction) by the torque vectoring mechanism 12, and the torque of the TV motor 4 is transmitted to the left wheel as negative torque −Nm (torque acting in the braking direction), which is torque acting in a direction opposite to the acting direction of the torque transmitted to the right wheel, by the torque vectoring mechanism 12.

Figure 4:
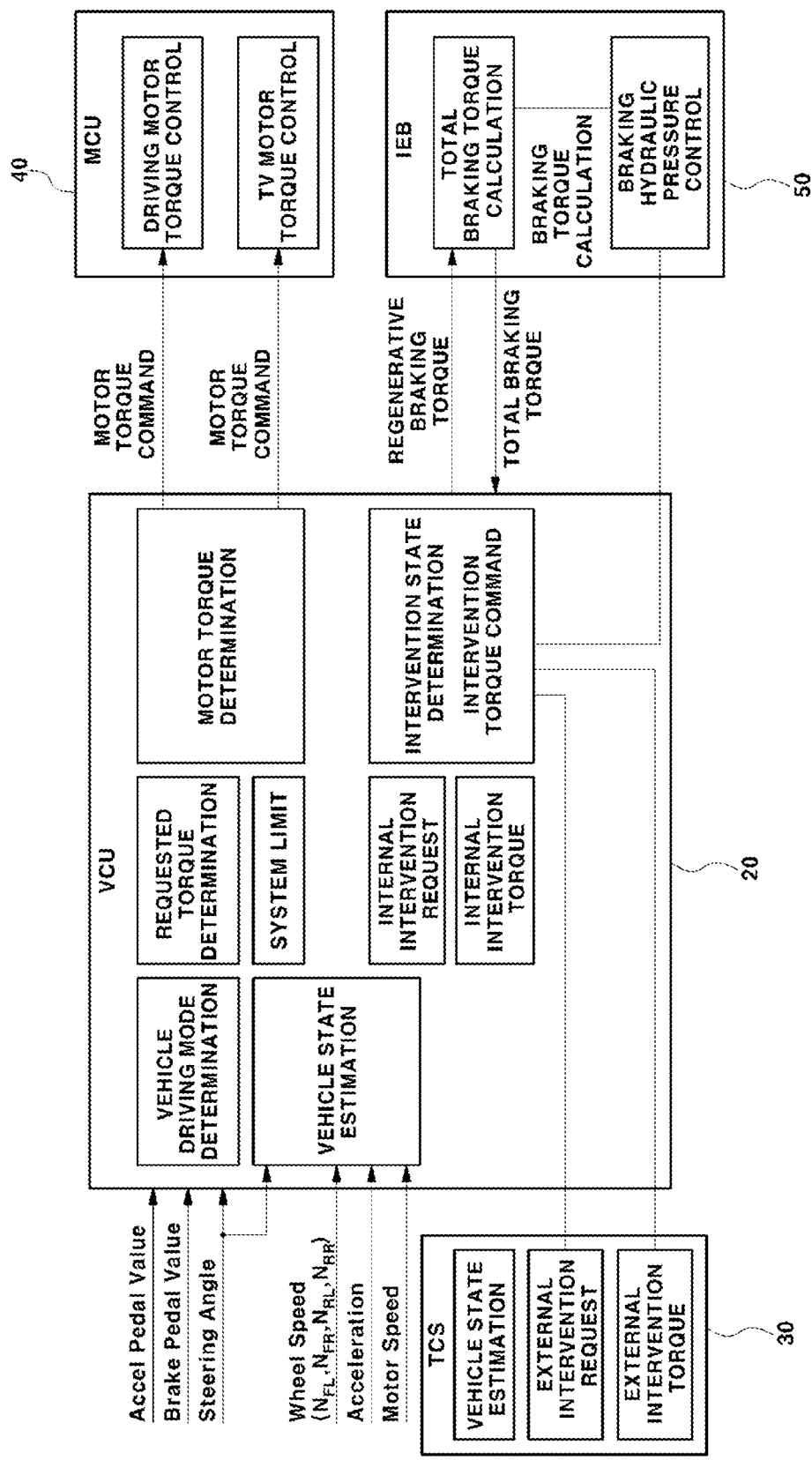
FIG. 4 is a block diagram showing control devices for performing a traction control process according to an exemplary embodiment of the present disclosure.

FIG. 4 is a block diagram showing control devices for performing a traction control process according to an exemplary embodiment of the present disclosure. In a vehicle provided with a TV motor, traction control for a vehicle according to an exemplary embodiment of the present disclosure may be performed under the cooperative control of a plurality of control units shown in FIG. 4.

FIG. 4 shows the state of cooperative control performed by a vehicle control unit (hereinafter referred to as a "VCU") 20, a TCS control unit (hereinafter referred to as a "TCS") 30, a motor control unit (hereinafter referred to as a "MCU") 40, and a brake control unit (hereinafter referred to as an "IEB") 50.

In FIG. 4, "IEB" represents a brake control unit. The brake control unit, which is configured to perform cooperative control, may be a control unit of an integrated electric brake (IEB). In FIG. 4, the control unit of the integrated electric brake (IEB), which is configured to perform cooperative control, is represented by "IEB."

In FIG. 4, "TCS" represents a TCS control unit. The TCS control unit may be substituted with an ESC control unit. The TCS control unit is a traction control unit included in the configuration of a traction control system (TCS), and is simply represented by "TCS" in FIG. 4. Similarly, the ESC control unit is included in the configuration of an ESC system. The ESC control unit may be represented by "ESC."

The VCU 20 obtains vehicle driving information in real time, which is detected through a vehicle driving information detection unit, estimates the state of the vehicle based on the obtained real-time vehicle driving information, determines a driving mode of the vehicle, and determines total requested torque.

Here, the vehicle driving information is information indicating the driving state of the vehicle, such as the state of the vehicle and operation input by the driver. The vehicle driving information includes an accelerator pedal input value (an APS value), a brake pedal input value (a BPS value), a steering angle (an SAS value), a wheel speed, a motor speed, and a longitudinal acceleration of the vehicle.

Furthermore, the vehicle driving information may further include a vehicle speed, gear stage information, and a lateral acceleration of the vehicle. The vehicle speed may be obtained from a signal from a wheel speed sensor. The information related to a gear stage (a D range, an R range, an N range, or a P range) may be obtained from a signal from a sensor which is configured to detect the position of a shift lever.

The driving information detection unit may include an accelerator pedal sensor configured for detecting a driver's accelerator pedal input value ("Accel Pedal Value" in FIG. 4), a brake pedal sensor configured for detecting a driver's brake pedal input value ("Brake Pedal Value"), and a steering angle sensor (SAS) for detecting a steering angle ("Steering Angle") as a driver's steering input value.

Furthermore, the driving information detection unit may further include a wheel speed sensor configured for detecting the wheel speed of the vehicle ("Wheel Speed"), a longitudinal acceleration sensor configured for detecting the longitudinal acceleration of the vehicle ("Acceleration"), and a motor speed sensor configured for detecting a motor speed ("Motor Speed"). Furthermore, the driving information detection unit may further include a shift lever position sensor configured for detecting the position of the shift lever and a lateral acceleration sensor configured for detecting the lateral acceleration of the vehicle.

The accelerator pedal sensor may be a typical accelerator pedal sensor (APS) mounted to the accelerator pedal, the brake pedal sensor may be a typical brake pedal sensor (BPS) mounted to the brake pedal, and the motor speed sensor may be a typical resolver mounted to each of the driving motor and the TV motor.

The VCU 20 is configured to determine total requested torque according to the driver's driving intention based on the real-time vehicle driving information. Furthermore, the VCU 20 is configured to determine whether a self-control intervention request is necessary so that an arbitrary control function may be performed according to predetermined control logic. Upon concluding that intervention is necessary, the VCU 20 requests internal intervention for torque correction, and at the same time, determines internal intervention torque.

Furthermore, the VCU 20 receives an external intervention request and external intervention torque information from an external control unit, and determines an external intervention situation through the external control unit. In the instant case, the VCU 20 receives an external intervention request for control intervention and torque correction and external intervention torque information from the external control unit so that an arbitrary control function may be performed according to predetermined control logic, such as stability control or turning radius reduction control.

Accordingly, the VCU 20 is configured to determine an intervention state in response to the internal intervention request and the external intervention request, and is configured to determine a final intervention torque command based on the internal intervention torque information and the external intervention torque information.

Furthermore, when the total requested torque command is determined, the VCU 20 applies a system limit value in response to the total requested torque command, and determines a motor torque command in consideration of the state of the battery and the load applied to electronic parts.

Furthermore, the VCU 20 is configured to determine a motor torque command for the driving motor (the first motor) (reference numeral 3 in FIG. 1) and a motor torque command for the TV motor (the second motor) (reference numeral 4 in FIG. 1) based on the determined motor torque command and the determined intervention torque command, and transmits the determined motor torque commands to the MCU 40.

Accordingly, the MCU 40 is configured to control operation of the driving motor 3 and the TV motor 4 through the inverter (reference numeral 2 in FIG. 1) based on the motor efficiency and mapped values in response to the motor torque command transmitted from the VCU 20. In the instant case, the MCU 40 may perform anti-jerk control for cancellation and reduction of motor vibration using the motor speed information.

The brake control unit (IEB) 50 is configured to determine total braking torque required based on the driver's brake pedal input value. Furthermore, the brake control unit 50 is configured to determine friction braking torque based on regenerative braking torque information (regenerative braking execution amount information) received from the VCU 20, and then is configured to control the braking hydraulic pressure of the wheel brake, which is a friction braking device (a hydraulic braking device) of the wheel, based on the determined friction braking torque. Accordingly, the friction braking force required may be applied to a corresponding wheel by the friction braking device.

The TCS control unit 30 (or the ESC control unit) estimates the state of the vehicle, such as a vehicle speed, oversteer, understeer, or cornering stiffness, based on the real-time vehicle driving information collected from the vehicle. Furthermore, to stably control the TCS, the TCS control unit 30 is configured to perform cooperative control with other control units, i.e., the VCU 20, the MCU 40, and the brake control unit 50, to control the braking hydraulic pressure of each wheel brake (the friction braking device of each wheel), and requests control intervention.

Here, the vehicle driving information may include at least some of the information detected by the above-described driving information detection unit. Furthermore, a single piece or a plurality of pieces of information selected among additional vehicle state information detected by other sensors or transmitted from other control units may be used as the vehicle driving information.

Furthermore, to perform torque vectoring control, the TCS control unit 30 is configured to perform cooperative control with other control units to control the braking hydraulic pressure of each wheel brake, to determine intervention torque, and to request control intervention (external intervention torque determination and external intervention request).

According to an exemplary embodiment of the present disclosure, the VCU 20 and the TCS control unit 30 may determine, based on the vehicle driving information collected from the vehicle, whether the vehicle is in a split-p situation in which the vehicle is traveling on a split road, in which the coefficient of friction p of the road surface with which the left wheel is in contact and the coefficient of friction p of the road surface with which the right wheel is in contact are different from each other.

Upon concluding that the vehicle is in a split-p situation, the VCU 20 and the TCS control unit 30 may control the speed of a wheel which is slipping, i.e., a slipping wheel. According to an exemplary embodiment of the present disclosure, the VCU 20 and the TCS control unit 30 may perform various cooperative control processes in the split-p situation. When the two control units simultaneously conclude that the vehicle is in a split-p situation, the two control units may perform cooperative control so that the VCU 20 controls the speed of the slipping wheel based on the target speed received from the TCS control unit 30.

Furthermore, when the VCU 20 controls the speed of the slipping wheel based on the target speed received from the TCS control unit 30, the TCS control unit 30 may perform, based on the torque value of the TV motor 4, control for reducing the braking torque of the friction braking device and control for reducing the driving torque of the driving motor 3. Furthermore, when performing the above-described cooperative control, the TCS control unit 30 has control over the driving motor 3, and the VCU 20 has control over the TV motor 4.

Furthermore, in the control intervention request and intervention torque determination process by the TCS control unit 30, in the event of a split-p situation, the TCS control unit 30 requests control intervention from the VCU 20 according to internal logic, and requests torque intervention with respect to the driving motor 3 from the VCU 20 according to the internal logic. Furthermore, the TCS control unit 30 requests torque intervention with respect to the friction braking device of the wheel from the brake control unit 50 according to internal logic.

In an exemplary embodiment of the present disclosure, "control intervention" and "torque intervention" may mean torque correction for performance of a specific control function. In the instant case, "intervention torque" may mean correction torque.

Alternatively, although described above as meaning correction, "control intervention" and "torque intervention" may mean torque transition for performance of a specific control function. In the instant case, the torque command may be transitioned from the driver's requested torque to the intervention torque.

That is, during torque intervention, the torque command may be transitioned from the driver's requested torque determined by the accelerator pedal input value (the APS value) and the brake pedal input value (the BPS value) to the intervention torque for performing a control function including a specific purpose.

The known torque intervention control may be performed by a top-level control unit, e.g., the VCU, and may be divided into internal torque intervention which is requested and performed by the VCU itself and external torque intervention which is performed in response to a cooperative control request from another control unit.

The internal torque intervention is a self-torque control function of the VCU, and may include motor traction control, motor torque vectoring control, and start slip control. The external torque intervention may include torque control which is not performed by the VCU alone but is performed when there is a request for cooperative control from an external control unit, such as the TCS control unit or the ABS control unit.

It has been described above that the VCU 20 is configured to perform intervention request and intervention torque determination and is configured to perform control of the speed of the slipping wheel based on the target speed received from the TCS control unit 30 in a split-μ situation. Hereinafter, the above-described speed control process will be described in more detail.

Although described above as being performed by a plurality of control units, the traction control process according to an exemplary embodiment of the present disclosure may be performed by a single integrated control element rather than the plurality of control units.

All of the plurality of control units and the single integrated control element may be collectively referred to as a controller, and the present controller may perform the traction control process of the present disclosure, which will be described below. In the following description, the controller includes a VCU, a TCS control unit, an MCU, and a brake control unit, and refers to all of the above control units unless specified otherwise.

Figure 5:
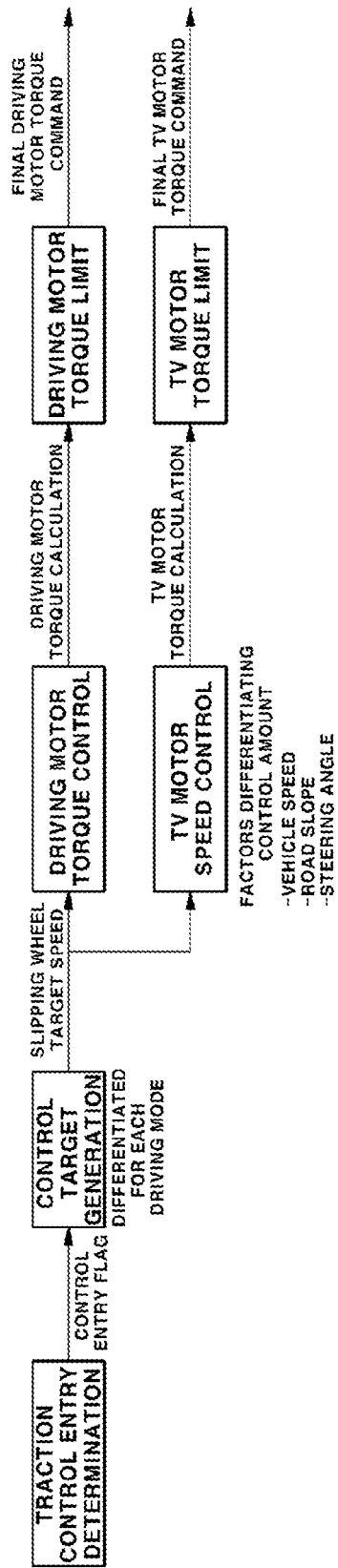
FIG. 5 is a diagram schematically showing a main process of a control method according to an exemplary embodiment of the present disclosure.
Figure 6:
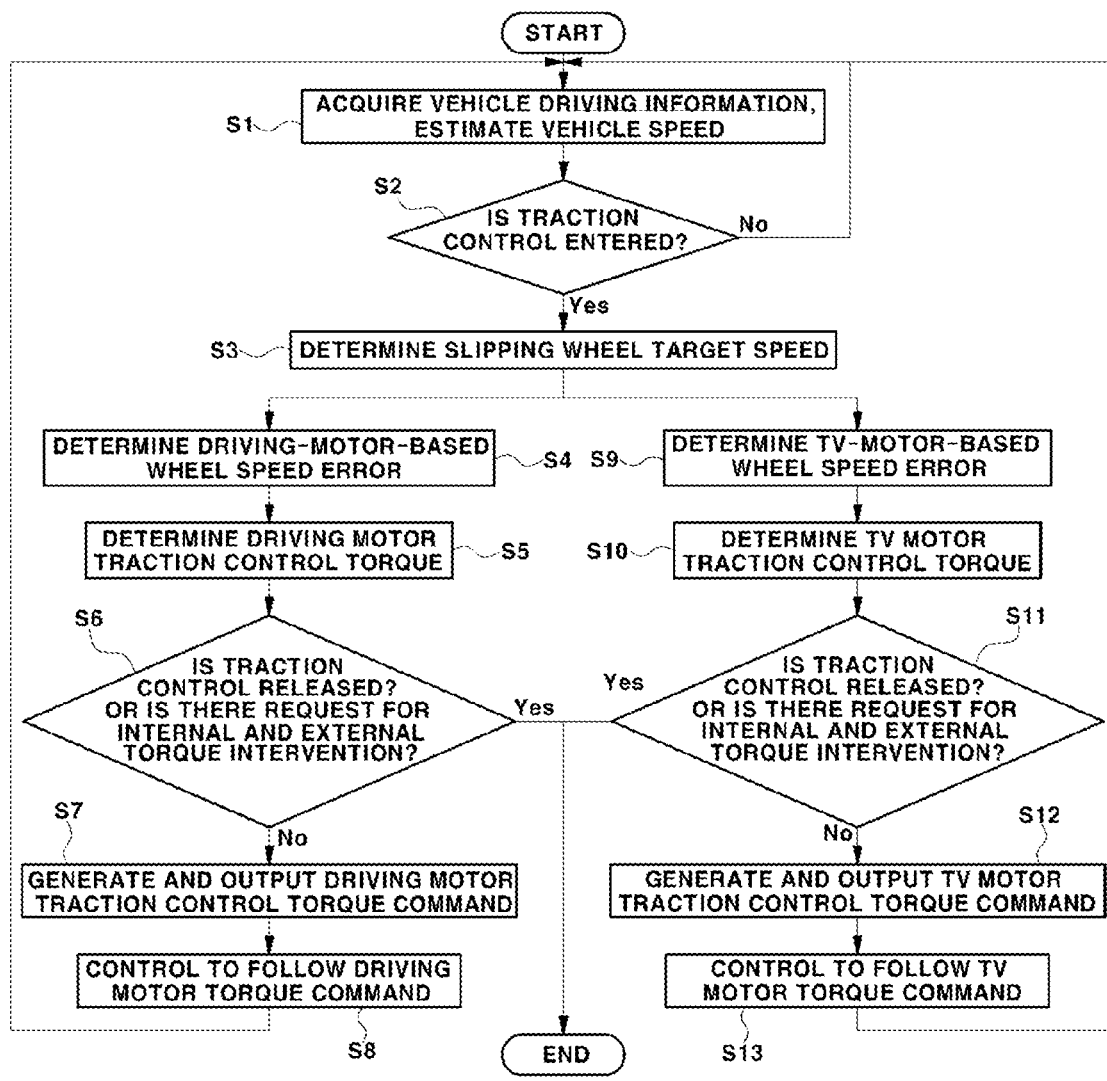
FIG. 6 is a flowchart showing the control process according to an exemplary embodiment of the present disclosure in more detail.
Figure 7:
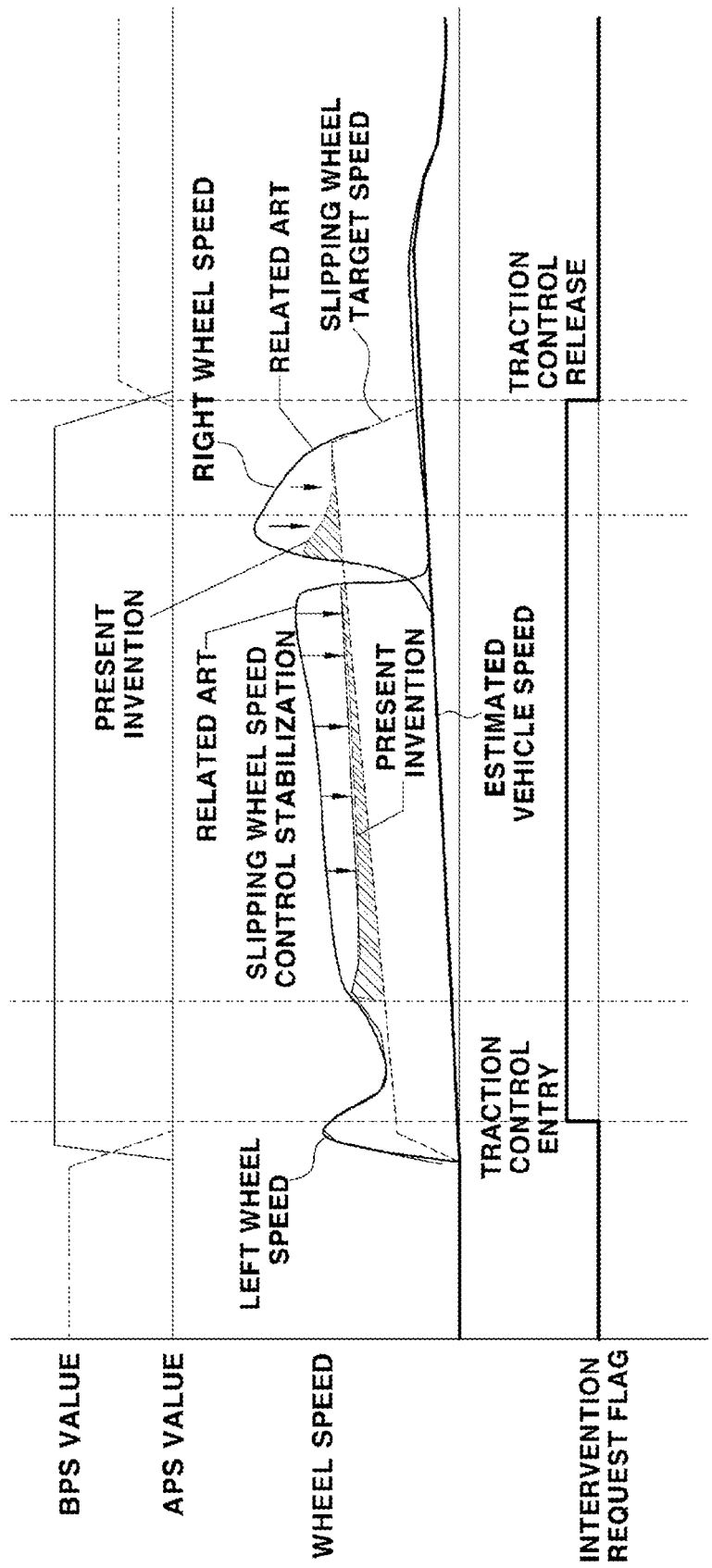
FIG. 7 is a diagram showing a control result and state according to an exemplary embodiment of the present disclosure.

FIG. 5 is a diagram schematically showing the main process of the control method according to an exemplary embodiment of the present disclosure, FIG. 6 is a flowchart showing the control process according to an exemplary embodiment of the present disclosure in more detail, and FIG. 7 is a diagram showing the control result and state according to an exemplary embodiment of the present disclosure.

Referring to FIG. 5, the controller is configured for determining whether a predetermined entry condition and a predetermined release condition are satisfied to determine entry and release of traction control. The controller is configured to generate a traction control flag (i.e., a traction control entry/release flag) indicating entry and release of traction control based on a result of determination (refer to FIG. 8).

Entry or release of traction control may be determined based on the state of the surface of a road on which the vehicle is traveling. In detail, entry or release of traction control may be determined depending on whether the vehicle is in a split-p situation, in which the vehicle is traveling on a road in which the coefficient of friction p of the road surface with which the left wheel is in contact and the coefficient of friction p of the road surface with which the right wheel is in contact are different from each other, a low-p situation, in which the vehicle is traveling on a low-friction road surface, or a homo-p situation, in which the vehicle is traveling on a road in which the coefficient of friction p of the road surface with which the left wheel is in contact and the coefficient of friction p of the road surface with which the right wheel is in contact are equal to each other.

When entry or release of traction control is determined, a control target differentiated for each vehicle driving mode is generated based on a result of determination. For example, a target speed of a wheel which is slipping among the left wheel and the right wheel, i.e., a target speed of a slipping wheel, may be determined and generated as the control target.

Subsequently, driving motor target torque for controlling the torque of the driving motor, which is the first motor, and TV motor target torque for controlling the speed of the TV motor, which is the second motor, are determined based on the vehicle driving information and the determined control target, and a final torque command for each motor may be determined to be a torque value to which motor torque limit is applied based on the determined target torque of the corresponding motor.

The TV motor target torque for controlling the speed of the TV motor may be determined to be differentiated according to the vehicle driving information obtained by the sensor of the driving information detection unit, such as the vehicle speed, the road slope, and the steering angle. Here, the road slope may be obtained using the vehicle acceleration (longitudinal acceleration) information obtained by the acceleration sensor of the driving information detection unit.

Figure 8:
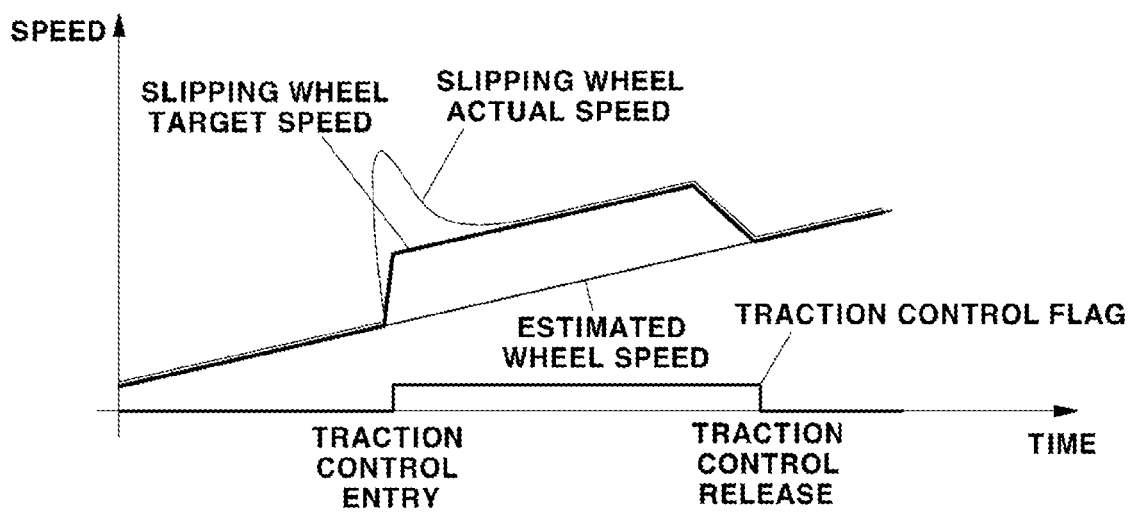
FIG. 8 is a diagram showing an actual speed of a slipping wheel, a target speed of the slipping wheel, and an estimated wheel speed when traction control of the present disclosure is entered.

FIG. 8 shows an actual speed of the slipping wheel, a target speed of the slipping wheel, and an estimated wheel speed when traction control of the present disclosure is entered. Here, the actual speed of the slipping wheel is a wheel speed of the slipping wheel detected by the wheel speed sensor, and the estimated wheel speed is a wheel speed estimated based on the speed of the driving system detected by the sensor. For example, a vehicle speed to be described later may be estimated based on the speed of the driving system, and the estimated wheel speed (the equivalent speed at a wheel) may be determined by converting the estimated vehicle speed into a speed at a wheel.

The traction control process according to the exemplary embodiment of the present disclosure will be described in more detail with reference to FIG. 6. As shown, the controller may obtain vehicle driving information through the driving information detection unit, may be configured to determine driver's requested torque based on the obtained vehicle driving information, and may estimate a vehicle speed (a reference vehicle speed) (step S1).

In the instant case, the controller may estimate a vehicle speed based on the speed of the driving system (the rotation speed of the driving system) detected by the sensor of the driving information detection unit. For example, the vehicle speed may be estimated using real-time wheel speed (wheel rotation speed) information detected as the speed of the driving system by the wheel speed sensor of each wheel. Hereinafter, the vehicle speed estimated in the instant way will be referred to as an "estimated vehicle speed."

The controller may obtain information on the real-time wheel speeds $N_{FL}$, $N_{FR}$, $N_{RL}$, and $N_{RR}$ of the respective wheels based on a signal from the wheel speed sensor to estimate the vehicle speed, and may be configured to determine the estimated vehicle speed based on the obtained information on the real-time wheel speeds of the respective wheels.

In detail, the controller may convert the respective wheel speeds (the real-time wheel speeds of the respective wheels) detected by the wheel speed sensor into vehicle body speeds, and then may be configured to determine the minimum value among the vehicle body speeds $V_{FL}$, $V_{FR}$, $V_{RL}$, and $V_{RR}$, converted from the wheel speeds $N_{FL}$, $N_{FR}$, $N_{RL}$, and $N_{RR}$, to be the estimated vehicle speed, as shown in Equation 4 below.

$$V_{veh}=\min(V_{FL},V_{FR},V_{RL},V_{RR}) \quad \text{[Equation 4]}$$

Here, $V_{veh}$ represents the estimated vehicle speed (km/hr), and $V_{FL}$, $V_{FR}$, $V_{RL}$, and $V_{RR}$ represent the vehicle body speeds (km/hr) converted from the real-time actual speeds $N_{FL}$, $N_{FR}$, $N_{RL}$, and $N_{RR}$ (RPM) of the respective wheels detected by the wheel speed sensor.

The estimated vehicle speed becomes a reference vehicle speed used to determine the occurrence of slip of each wheel and to determine a slip ratio. The reference vehicle speed means a vehicle speed in a non-slip state, and is information necessary for TCS operation and traction control.

In Equation 4, the vehicle body speeds and the estimated vehicle speed may be substituted with the wheel speeds $N_{FL}$, $N_{FR}$, $N_{RL}$, and $N_{RR}$ and the estimated wheel speed, and the minimum value among the wheel speeds may be determined to be the estimated wheel speed. Furthermore, the estimated vehicle speed, which is the reference vehicle speed, may be determined based on the determined estimated wheel speed.

If the wheel speed sensor fails, the estimated wheel speed $N_{wheel}$ may be determined based on the real-time driving motor speed $N_{main}$ obtained from the signal from the sensor of the driving information detection unit, i.e., the resolver mounted to the driving motor, as shown in Equation 5 below, and the estimated vehicle speed $V_{veh}$, which is the reference vehicle speed, may be determined based on the estimated wheel speed $N_{wheel}$.

$$N_{wheel}=N_{main}\times FGR_{Drive} \quad \text{[Equation 5]}$$

Here, $N_{main}$ represents the driving motor speed, and $FGR_{Drive}$ represents a driving motor reduction ratio, which is a reduction ratio between the driving motor and the wheel.

Alternatively, a vehicle speed corresponding to an integration result obtained by integrating a vehicle acceleration $a_x$ detected by the acceleration sensor may be determined to be the estimated vehicle speed $V_{veh}$, and the estimated wheel speed may be determined based on the determined estimated vehicle speed.

Alternatively, in the case of a 2-wheel drive (2WD) vehicle, the average speed of the speed of a left non-driving wheel and the speed of a right non-driving wheel detected by the wheel speed sensor may be determined to be the estimated wheel speed, and the estimated vehicle speed may be determined based on the estimated wheel speed.

In the case of a 4-wheel drive (4WD) vehicle, as described above, a speed obtained by integrating the vehicle acceleration detected by the acceleration sensor may be determined to be the estimated vehicle speed $V_{veh}$, and the estimated wheel speed may be determined based on the determined estimated vehicle speed.

Furthermore, the controller is configured for determining entry and release of traction control based on the current vehicle driving state (steps S2, S6, and S11). In detail, the controller is configured for determining whether a predetermined entry condition and a predetermined release condition are satisfied based on information indicating the vehicle driving state, i.e., vehicle driving information detected by the driving information detection unit, to determine entry and release of traction control.

To the present end, an entry condition for determining entry of traction control and a release condition for determining release of traction control are set in advance in the controller. Upon concluding that the entry condition is satisfied based on the vehicle driving information, the controller is configured for determining to enter traction control, and is configured to determine and to generate a target wheel speed as the control target. Here, the target wheel speed includes a target wheel speed of a slipping wheel, which is a wheel slipping among the left wheel and the right wheel, i.e., the slipping wheel target speed described above with reference to FIG. 5.

According to an exemplary embodiment of the present disclosure, the entry condition for traction control includes a first condition associated with a driver's driving input state and second and third conditions associated with the vehicle state among the vehicle driving information indicating the vehicle driving state. When all of the first, second, and third conditions are satisfied, the controller is configured for determining that the entry condition for traction control is satisfied, and is configured to determine to enter traction control. In the instant case, the driver's driving input state includes a gear stage state, an accelerator pedal input value, and a brake pedal input value.

The first condition includes a condition in which the gear stage state corresponds to the D (Drive) range or the Reverse (R) range, a condition in which the driver's accelerator pedal input value is greater than a predetermined first threshold value, and a condition in which the driver's brake pedal input value is less than a predetermined second threshold value.

Accordingly, when all of the condition in which the gear stage state corresponds to the D range or the R range, the condition in which the driver's accelerator pedal input value is greater than the first threshold value, and the condition in which the driver's brake pedal input value is less than the second threshold value are satisfied, the controller is finally configured to conclude that the first condition is satisfied.

Furthermore, the second condition may be set as a condition in which the TV motor speed detected by the motor speed sensor (the resolver) of the driving information detection unit is greater than a predetermined third threshold value, a condition in which a difference between the left wheel speed and the right wheel speed detected by the wheel speed sensor is greater than a predetermined fourth threshold value, a condition in which all of differences between the estimated wheel speed and the respective wheel speeds are greater than a predetermined fifth threshold value, or a condition in which the vehicle is in a split-p situation in which a road on which the vehicle is currently traveling is a split road.

Furthermore, the third condition includes a condition in which the lateral acceleration of the vehicle detected by the lateral acceleration sensor of the driving information detection unit is less than a predetermined threshold lateral acceleration.

As a result, upon concluding that all of the first condition, the second condition, and the third condition among the entry conditions for traction control are satisfied, the controller is configured for determining to enter traction control.

Upon concluding to enter traction control, the controller is configured for determining a slipping wheel target speed according to internal logic stored therein (step S3), is configured to perform driving motor torque control to satisfy the driver's requested torque (steps S4 to S8), and is configured to perform TV motor torque control so that the slipping wheel speed (the actual speed of a slipping wheel) follows the determined slipping wheel target speed (steps S9 to S13).

Describing the split-p situation in more detail, the controller is configured for determining whether the vehicle is in a split-p situation, i.e., a situation in which a road on which the vehicle is currently traveling is a split road, in which the coefficient of friction p of the road surface with which the left wheel is in contact and the coefficient of friction p of the road surface with which the right wheel is in contact are different from each other.

In the following description, detecting a split road means determining whether a road on which the vehicle is currently traveling is a split road, and detecting a split-p situation means determining whether the vehicle is in a split-p situation.

Referring to FIG. 7, a time point at which the BPS value decreases and the APS value increases is a time point of start of the vehicle. When the vehicle starts, the controller is configured for determining the current road state to detect a split-p situation.

In the instant case, when the estimated vehicle speed, which is the reference vehicle speed, is determined based on the wheel speeds of the respective wheels, a determination may be made as to whether each of the wheels is slipping. As shown in Equation 6 below, when a difference between the estimated vehicle speed $V_{veh}$, which is the reference vehicle speed, and each of the vehicle body speeds $V_{FL}$, $V_{FR}$, $V_{RL}$, and $V_{RR}$, converted from the wheel speeds of the respective wheels, is greater than a predetermined threshold speed, it may be determined that a corresponding wheel is slipping.

If $|V_{veh}-V_{FL}|$>threshold speed,$Slip_{FL}$=1

If $|V_{veh}-V_{FR}|$>threshold speed,$Slip_{FR}$=1

If $|V_{veh}-V_{RL}|$>threshold speed,$Slip_{RL}$=1

If $|V_{veh}-V_{RR}|$>threshold speed,$Slip_{RR}$=1     [Equation 6]

In Equation 6, "$Slip_{FL}$=1", "$Slip_{FR}$=1", "$Slip_{RL}$=1", and "$Slip_{RR}$=1" represent that a corresponding wheel is slipping. If only one of the left wheel and the right wheel is slipping, the controller may be configured to conclude that the vehicle is in a split-p situation. That is, if "((($Slip_{FL}$ XOR $Slip_{FR}$)==1) OR (($Slip_{RL}$ XOR $Slip_{RR}$)==1))==1" is satisfied, the controller is configured for determining that a road is a split road and the vehicle is in a split-p situation.

Furthermore, according to the determination results shown in Equation 6, if "$Slip_{FL}$==1 and $Slip_{FR}$==0" or "$Slip_{RL}$==1 and $Slip_{RR}$==0" is satisfied, it means that the left wheel is slipping, and if "$Slip_{FL}$==0 and $Slip_{FR}$==1" or "$Slip_{RL}$==0 and $Slip_{RR}$==1" is satisfied, it means that the right wheel is slipping.

In Equation 6, the vehicle body speeds $V_{FL}$, $V_{FR}$, $V_{RL}$, and $V_{RR}$, converted from the respective wheel speeds, and the estimated vehicle speed $V_{veh}$, which is the reference vehicle speed, may be substituted with the respective wheel speeds detected by the wheel speed sensor and the estimated wheel speed. In the instant case, the threshold speed may include the fifth threshold value.

Next, the release condition for traction control is a condition for determining whether to release traction control in the state in which traction control is entered. The release condition for traction control includes a fourth condition associated with a driver's driving input state, fifth and sixth conditions associated with the vehicle state, and a condition associated with a request for internal and external torque intervention control.

In detail, when the fourth condition is satisfied, when the fifth condition is satisfied, when the sixth condition is satisfied, or when there is a request for internal and external torque intervention control, the controller may be configured to conclude that the release condition for traction control is satisfied.

If the release condition for traction control is not satisfied, the controller is configured to maintain traction control, and is configured to determine commands of the driving motor torque value and the TV motor torque value determined according to traction control logic, i.e., commands of traction control torque values of the respective motors, to be torque commands for the driving motor and the TV motor.

The fourth condition may be set as a condition in which the gear stage state does not correspond to the D (Drive) range or the Reverse (R) range but corresponds to another gear stage (the Neutral (N) range or the Parking (P) range), a condition in which the driver's accelerator pedal input value is equal to or less than a predetermined first threshold value, or a condition in which the driver's brake pedal input value is equal to or greater than a predetermined second threshold value.

When the accelerator pedal input value is equal to or less than the first threshold value (e.g., accelerator pedal input value==0) and when the vehicle is in a homo-μ situation, the controller may be configured to conclude that the fourth condition is satisfied, and may release traction control. The first threshold value and the second threshold value may be set to the same values as those in the first condition among the entry conditions for traction control.

The fifth condition includes a condition in which the TV motor speed detected by the motor speed sensor (the resolver) is equal to or less than a predetermined third threshold value, a condition in which a difference between the left wheel speed and the right wheel speed detected by the wheel speed sensor is equal to or less than a predetermined fourth threshold value, a condition in which all of differences between the estimated wheel speed and the respective wheel speeds are equal to or less than a predetermined fifth threshold value, and a condition in which the vehicle is not in a split-μ situation in which a road on which the vehicle is currently traveling is a split road.

When all of the condition in which the TV motor speed is equal to or less than the third threshold value, the condition in which a difference between the left wheel speed and the right wheel speed is equal to or less than the fourth threshold value, the condition in which all of differences between the estimated wheel speed and the respective wheel speeds are equal to or less than the fifth threshold value, and the condition in which the vehicle is not in a split-μ situation are satisfied, the controller is finally configured to conclude that the fifth condition is satisfied. The third threshold value, the fourth threshold value, and the fifth threshold value may be set to the same values as those in the second condition among the entry conditions for traction control.

Here, the condition in which the vehicle is not in a split-μ situation means a condition in which the vehicle is in a homo-μ situation or a low-μ situation. As may be seen from Equation 6, the homo-μ situation is a situation in which none of the wheels are slipping, i.e., a situation in which neither the left-front wheel nor the right-front wheel is slipping and neither the left-rear wheel nor the right-rear wheel is slipping. Furthermore, as may be seen from Equation 6, the low-μ situation is a situation in which, among the front wheels (the left wheel and the right wheel) and the rear wheels (the left wheel and the right wheel), only the left-front wheel and the right-front wheel are slipping or only the left-rear wheel and the right-rear wheel are slipping.

Furthermore, the sixth condition includes a condition in which the lateral acceleration of the vehicle detected by the lateral acceleration sensor of the driving information detection unit is equal to or greater than a predetermined threshold lateral acceleration. The threshold lateral acceleration may be set to the same value as that in the third condition among the entry conditions for traction control.

The purpose of determining entry and release of traction control based on the lateral acceleration of the vehicle among the above-described entry and release conditions for traction control is to functionally separate a traction control region and a torque vectoring control region from each other.

Hereinafter, a process of determining a driving-motor-based wheel speed error and a TV-motor-based wheel speed error using the slipping wheel target speed and the slipping wheel actual speed will be described.

As shown in the flowchart in FIG. 6, when the slipping wheel target speed is determined, a step of determining a driving-motor-based wheel speed error (step S4) and a step of determining a TV-motor-based wheel speed error (step S9) are performed.

The driving-motor-based wheel speed error is used to determine the driving motor traction control torque, and the TV-motor-based wheel speed error is used to determine the TV motor traction control torque.

Figure 9:
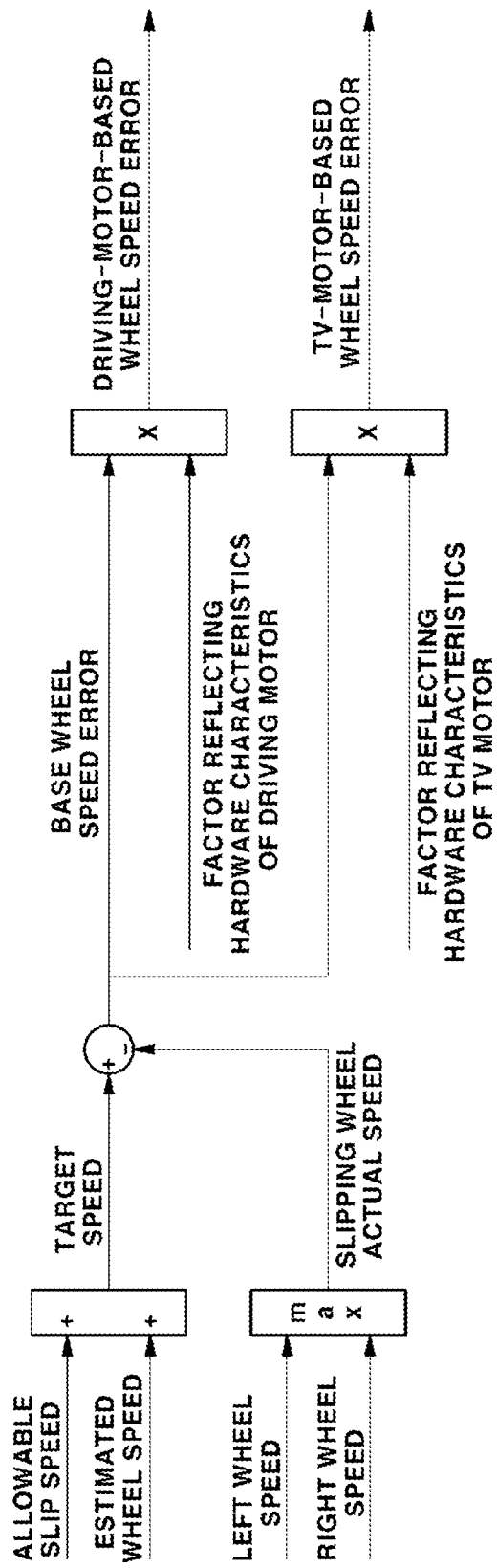
FIG. 9 is a diagram for explaining a method of determining a wheel speed error according to a slipping wheel target speed in an exemplary embodiment of the present disclosure.

FIG. 9 is a diagram for explaining a method of determining a wheel speed error according to a slipping wheel target speed in an exemplary embodiment of the present disclosure.

The controller may be configured to determine a value obtained by adding an allowable slip speed to the estimated wheel speed to be the slipping wheel target speed, as shown in FIG. 9 and Equation 7 below. Here, the estimated wheel speed is a speed obtained by converting the estimated vehicle speed into a rotation speed of the wheel.

$$\text{slip target speed} = \text{estimated wheel speed} + \text{allowable slip speed} \quad [\text{Equation 7}]$$

The allowable slip speed may be differentiated according to the vehicle driving mode and the hardware characteristics of the TV motor. That is, the controller may be configured to determine the allowable slip speed based on a value determined according to the vehicle driving mode and the hardware characteristics of the TV motor using setting information. In the instant case, the allowable slip speed may be determined to be within a base speed (base RPM) in a torque-speed graph (a T-N graph) as the hardware characteristics of the TV motor.

When the slipping wheel target speed is determined, the controller may perform speed control so that the slipping wheel speed (the slipping wheel actual speed) follows the determined slipping wheel target speed. In the instant case, the controller may perform speed control using the TV motor so that the slipping wheel speed follows the slipping wheel target speed. In detail, the controller may perform PID control using the TV motor so that the slipping wheel speed follows the slipping wheel target speed. Here, the slipping wheel speed is an actual speed of a wheel which is actually slipping (a slipping wheel actual speed), and is a larger one of the left wheel speed and the right wheel speed.

Furthermore, the controller is configured for determining a base wheel speed error, which is a difference between the slipping wheel target speed and the slipping wheel actual speed. Here, the slipping wheel actual speed is a speed of a wheel which is actually slipping, and thus corresponds to the maximum value (a higher speed) of the left wheel speed and the right wheel speed detected by the wheel speed sensor. Alternatively, a wheel which is slipping may be determined based on a result of determination using Equation 6, and the maximum value of the speed of the wheel which is slipping may be determined to be the slipping wheel actual speed.

After determining the base wheel speed error, the controller is configured for determining a wheel which is slipping among the left wheel and the right wheel, and is configured to determine a motor-based wheel speed error by multiplying the determined base wheel speed error by a factor value for reflecting the hardware characteristics of each motor (steps S4 and S9).

A wheel which is slipping may be determined based on a result of determination using Equation 6. If "$\text{Slip}_{FL}=1$ and $\text{Slip}_{FR}=0$" or "$\text{Slip}_{RL}=1$ and $\text{Slip}_{RR}=0$" is satisfied, it means that the left wheel is slipping, and if "$\text{Slip}_{FL}=0$ and $\text{Slip}_{FR}=1$" or "$\text{Slip}_{RL}=0$ and $\text{Slip}_{RR}=1$" is satisfied, it means that the right wheel is slipping.

The factor value for determining the motor-based wheel speed error is a value determined according to the hardware characteristics of the driving motor and the TV motor. A value determined according to the hardware characteristics of each motor may be stored in advance in the controller, and may be used as the factor value.

The factor value is a value which is selected and varied according to the current hardware characteristics of each motor. As a value determined according to the hardware characteristics of each motor, the factor value reflecting the hardware characteristics of the driving motor may be determined to be +1 regardless of slip of the left and right wheels when the vehicle is moving forwards, i.e., when the current gear stage state corresponds to the D (Drive) range, and may be determined to be −1 regardless of slip of the left and right wheels when the vehicle is moving backwards, i.e., when the current gear stage state corresponds to the Reverse (R) range.

Furthermore, as a value determined according to the hardware characteristics of each motor, the factor value reflecting the hardware characteristics of the TV motor may be determined to be +1 when the left wheel is slipping and to be −1 when the right wheel is slipping in the state in which the vehicle is moving forwards, i.e., in which the current gear stage state corresponds to the D (Drive) range, and may be determined to be −1 when the left wheel is slipping and to be +1 when the right wheel is slipping in the state in which the vehicle is moving backwards, i.e., in which the current gear stage state corresponds to the Reverse (R) range.

As described above, values predetermined according to the gear stage state or according to the gear stage state and the state of a wheel which is slipping (i.e., the state of a slipping wheel) may be used as the factor value reflecting the hardware characteristics of each motor. Furthermore, the factor value for each motor according to each situation may be set in advance in the controller, and may be used to determine and determine each motor-based wheel speed error based on the base wheel speed error during the traction control process according to an exemplary embodiment of the present disclosure.

Furthermore, as described above, according to an exemplary embodiment of the present disclosure, the motor-based wheel speed error is obtained for each motor. That is, each motor-based wheel speed error is obtained for a corresponding one of the driving motor and the TV motor. Therefore, the motor-based wheel speed error includes a driving-motor-based wheel speed error and a TV-motor-based wheel speed error.

The driving-motor-based wheel speed error and the TV-motor-based wheel speed error are determined based on the base wheel speed error using the factor value for each motor determined according to the gear stage state or according to the gear stage state and the state of a wheel which is slipping (steps S4 and S9).

Figure 10:
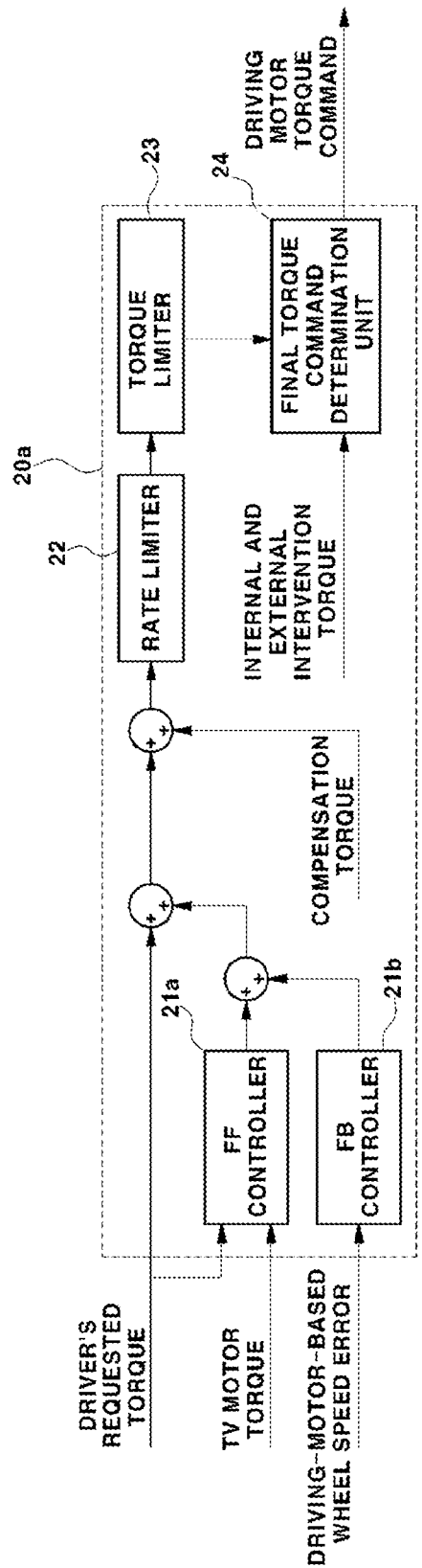
FIG. 10 is a block diagram showing a determination process of a driving motor torque determination unit in a controller according to an exemplary embodiment of the present disclosure.
Figure 11:
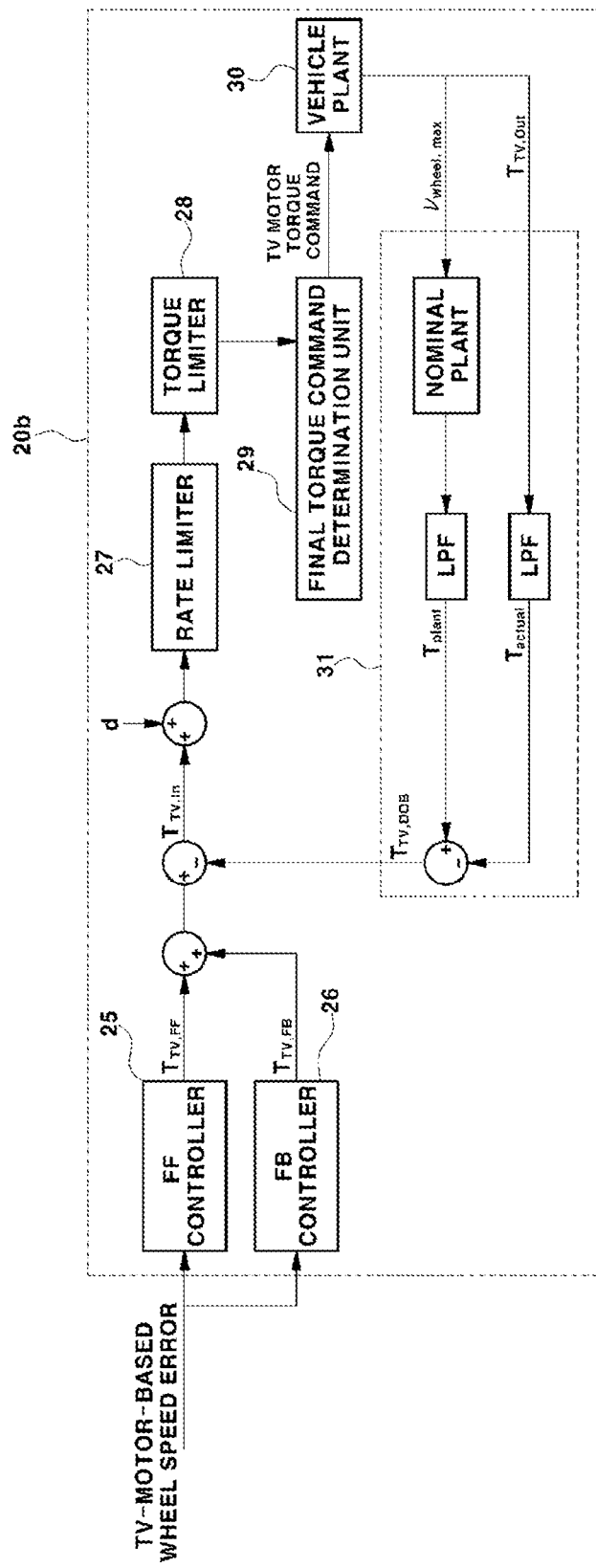
FIG. 11 is a block diagram showing a determination process of a TV motor torque determination unit in the controller according to an exemplary embodiment of the present disclosure.

FIG. 10 is a block diagram showing a determination process of a driving motor torque determination unit in the controller according to an exemplary embodiment of the present disclosure, and FIG. 11 is a block diagram showing a determination process of a TV motor torque determination unit in the controller according to an exemplary embodiment of the present disclosure.

After traction control is entered, the driving-motor-based wheel speed error and the TV-motor-based wheel speed error determined as described above are input to motor torque determination units 20a and 20b in the controller, which determine each motor torque during traction control, i.e., driving motor traction control torque and TV motor traction control torque.

According to an exemplary embodiment of the present disclosure, the controller includes motor torque determination units 20a and 20b, which receive the motor-based wheel speed error as an input. Here, the motor-based wheel speed error includes the driving-motor-based wheel speed error and the TV-motor-based wheel speed error.

In detail, the motor torque determination units of the controller include a driving motor torque determination unit 20a, which is configured to determine driving motor traction control torque using the driving-motor-based wheel speed error as an input, and a TV motor torque determination unit 20b, which is configured to determine TV motor traction control torque using the TV-motor-based wheel speed error as an input. The driving motor torque determination unit 20a further utilizes the driver's requested torque and the actual TV motor torque as inputs in addition to the driving-motor-based wheel speed error.

Furthermore, the motor torque determination units 20a and 20b include feedforward controllers 21a and 25 and feedback controllers 21b and 26, and the motor-based wheel speed error, which is a slipping wheel speed error, is used as an input to the feedback controllers 21b and 26. That is, the driving-motor-based wheel speed error is used as an input to the feedback controller 21b in the driving motor torque determination unit 20a, and the TV-motor-based wheel speed error is used as an input to the feedback controller 26 in the TV motor torque determination unit 20b.

The TV-motor-based wheel speed error is also used as an input to the feedforward controller 25 in the TV motor torque determination unit 20b. The driver's requested torque and the actual TV motor torque are used as inputs to the feedforward controller 21a in the driving motor torque determination unit 20a.

FIG. 10 shows a process of determining driving motor traction control torque based on the driver's requested torque, the actual TV motor torque, and the driving-motor-based wheel speed error (step S5) and a process of finally outputting a driving motor torque command to output and generate the determined driving motor traction control torque from the driving motor (step S7).

The driving motor traction control torque is driving motor torque that needs to be generated to satisfy the driver's requested torque during traction control, and the final torque command generated and output from the driving motor torque determination unit 20a is a torque command for the driving motor, which causes the driving motor to generate driving motor traction control torque.

FIG. 11 shows a process of determining TV motor traction control torque based on the TV-motor-based wheel speed error (step S10) and a process of finally outputting a TV motor torque command to output and generate the determined TV motor traction control torque from the TV motor (step S12).

The TV motor traction control torque is TV motor torque that needs to be generated to cause the slipping wheel speed to follow the slipping wheel target speed during traction control, and the final torque command generated and output from the TV motor torque determination unit 20b is a torque command for the TV motor, which causes the TV motor to generate TV motor traction control torque.

First, a process of determining the driving motor torque command will be described with reference to FIG. 10. The driver's requested torque, determined based on the real-time vehicle driving information, the actual TV motor torque, and the driving-motor-based wheel speed error are input to the driving motor torque determination unit 20a, which is configured to determine the driving motor torque command in the controller.

Here, the actual TV motor torque is actual TV motor output torque which may be output in response to a final TV motor torque command output from the TV motor torque determination unit 20b as TV motor traction control torque determined by the TV motor torque determination unit 20b during traction control.

After traction control is entered, the driving motor needs to reflect the driver's intention even in the traction control situation. To the present end, the driving motor torque determination unit 20a of the controller is configured for determining driving motor traction control torque and a driving motor torque command by adding reduction torque and compensation torque to the driver's requested torque.

Here, the reduction torque is determined based on feedforward reduction torque determined by and output from the feedforward controller 21a and feedback reduction torque determined by and output from the feedback controller 21b. In the instant case, a value obtained by summing the feedforward reduction torque and the feedback reduction torque may be determined to be the reduction torque.

The feedforward controller 21a of the driving motor torque determination unit 20a is configured for determining and outputting the feedforward reduction torque using the driver's requested torque and the actual TV motor torque as an input, and the feedback controller 21b is configured for determining and outputting the feedback reduction torque using the wheel speed error, i.e., the driving-motor-based wheel speed error, as an input.

In the vehicle to be controlled to which an exemplary embodiment of the present disclosure is applied, due to the mechanical characteristics of an open differential (OD) mounted therein, the driving torque of the driving motor is cancelled by an amount equivalent to the braking torque of the TV motor applied to a slipping wheel, and thus reactive force is formed in the open differential. Furthermore, when the driving torque of the driving motor is transmitted to a grounded wheel (a wheel opposite to the slipping wheel among the left wheel and the right wheel), an amount thereof equivalent to the driving torque of the TV motor applied to the grounded wheel is transmitted to the grounded wheel. As a result, the torque transmitted to the grounded wheel is equal to or greater than twice the driving torque applied to the grounded wheel from the TV motor.

Therefore, when the torque of the driving motor becomes greater than twice the driving torque supplied from the TV motor, the remaining excess driving force is used to accelerate the slipping wheel. Accordingly, to remove the excess driving force, the feedforward reduction torque of the driving motor may be determined as shown in Equation 8 below.

According to the exemplary embodiment of the present disclosure, the feedforward controller 21a of the driving motor torque determination unit 20a may be configured for determining the feedforward reduction torque based on the driver's requested torque and the actual TV motor torque, as shown in Equation 8 below.

feedforward reduction torque=−1×(|driver's requested torque|−2×|actual TV motor torque|)× $K_f$     [Equation 8]

Here, "||" represents an absolute value, and $K_f$ represents the above-described factor value (+1 for the D range, −1 for the R range) reflecting the hardware characteristics of the driving motor.

Furthermore, the feedback controller 21b of the driving motor torque determination unit 20a may be configured for determining the feedback reduction torque through PID control based on the wheel speed error (the slipping wheel speed error) to secure control stability. That is, the feedback controller 21b may be configured to determine the feedback reduction torque using the driving-motor-based wheel speed error as an input, as shown in Equation 9 below.

$$FB\_Tq = \text{error}_{Drive} \times K_p + \int \text{error}_{Drive} dt \times K_i + \frac{d}{dt}(\text{error}_{Drive}) \times K_d \quad \text{[Equation 9]}$$

Here, FB_Tq represents the feedback reduction torque, $\text{error}_{Drive}$ represents the driving-motor-based wheel speed error, and $K_p$, $K_i$, and $K_d$ represent P gain, I gain, and D gain, respectively. The I-term torque in Equation 9 is reset to 0 when traction control is released.

In Equation 9, the feedback reduction torque FB_Tq is determined using the driving-motor-based wheel speed error $\text{error}_{Drive}$. The method of determining the driving-motor-based wheel speed error $\text{error}_{Drive}$ is as described with reference to FIG. 9.

However, when the grounded wheel slips, to reduce the torque of the driving motor, the feedback controller 21b of the driving motor torque determination unit 20a in the controller is configured to correct the driving-motor-based wheel speed error, as shown in Equation 10 below, and utilizes the corrected driving-motor-based wheel speed error (corrected $\text{error}_{Drive}$) as the driving-motor-based wheel speed error $\text{error}_{Drive}$ in Equation 9.

corrected $\text{error}_{Drive}$=$\text{error}_{Drive}$+(grounded wheel target speed−grounded wheel actual speed)     [Equation 10]

Here, $\text{error}_{Drive}$ is the driving-motor-based wheel speed error determined by the method described with reference to FIG. 9. The grounded wheel is a wheel opposite a slipping wheel that slips when traction control is entered. That is, the grounded wheel is a wheel that does not slip when traction control is entered. Furthermore, in Equation 10, the grounded wheel target speed is an estimated wheel speed converted from the estimated vehicle speed, and the grounded wheel actual speed is a grounded wheel speed detected by the wheel speed sensor.

The driving motor torque determination unit 20a of the controller is configured to monitor the grounded wheel speed detected by the wheel speed sensor after traction control is entered. Upon concluding that the grounded wheel slips using Equation 6, the driving motor torque determination unit 20a is configured to determine the corrected driving-motor-based wheel speed error (corrected $\text{error}_{Drive}$) using Equation 10, and then utilizes the same as the driving-motor-based wheel speed error $\text{error}_{Drive}$ in Equation 9 to determine the feedback reduction torque FB_Tq.

The driving force is concentrated on the grounded wheel during traction control. Therefore, when it is determined that the grounded wheel slips based on a result of monitoring the grounded wheel speed detected by the wheel speed sensor, it is necessary to reduce the torque of the driving motor.

Furthermore, compensation torque may be determined to maximize the use of frictional force between the grounded and slipping wheels and the road surface. The compensation torque is determined so that the currently output traction control torque follows the driver's requested torque.

To secure control stability, a separate rate limiter for limiting a rate may be applied to determination of the compensation torque, limiting the compensation torque when the grounded wheel slips.

The driving motor torque determination unit 20a of the controller may be configured to determine the compensation torque based on the driver's requested torque and the actual TV motor torque.

In the instant case, the driving motor torque determination unit 20a may be configured to determine the compensation torque using a map. The map is setting data in which the compensation torque is set to values corresponding to input variables. The input variables of the map may be the driver's requested torque and the actual TV motor torque. The actual TV motor torque is as described above.

The purpose of applying the compensation torque in the instant way is to allow the driving motor traction control torque to follow the driver's requested torque by summing the compensation torque values (reflection of the driver's intention).

In the map, the compensation torque may be set to a larger value as the driver's requested torque increases and the actual TV motor torque decreases. The reason why the compensation torque is set to a larger value as the driver's requested torque increases under the condition that the actual TV motor torque is constant is to reflect the driver's intention.

Furthermore, in the case of the TV motor, the TV motor torque includes a large value because the amount of driving force transmitted to a slippery road surface is large. Therefore, to reduce the driving motor torque, the compensation torque is set to a smaller value as the actual TV motor torque increases.

That is, under the condition that the driver's requested torque is constant, a smaller compensation value is used as the actual TV motor torque increases, reducing the traction control torque in inverse proportion to the increase in the actual TV motor torque.

Furthermore, to secure control stability, a separate rate limiter for limiting the rate of the compensation torque may be provided and used. Furthermore, a separate torque limiter configured for limiting the compensation torque when it is determined that the grounded wheel slips may be provided and used.

Meanwhile, the driving motor traction control torque may be obtained by summing the driver's requested torque, the reduction torque, and the compensation torque as described above. The driving motor torque determination unit 20a may sequentially apply rate limit and torque limit (saturation) to the above torque value obtained through summation to determine final driving motor traction control torque (step S5).

Furthermore, the driving motor torque determination unit 20a generates a driving motor torque command corresponding to the determined final driving motor traction control torque value (step S7). As a result, the controller is configured to perform driving motor torque control following the driving motor torque command (step S8).

To the present end, the driving motor torque determination unit 20a includes a rate limiter 22 and a torque limiter 23. The rate limiter 22 limits the rate of the torque value obtained by summing the driver's requested torque, the reduction torque, and the compensation torque (the driving motor traction control torque value before application of rate limit) to a rate value set for protection of hardware. The output value from the rate limiter 22, i.e., the torque value after application of rate limit, is input to the torque limiter 23.

The torque limiter 23 is configured to perform torque limit according to the torque-speed (T-N) graph of the driving motor with respect to the input value (the driving motor traction control torque value before application of torque limit). That is, when the torque limit value corresponding to the driving motor speed detected by the sensor (the resolver) is obtained from the torque-speed graph, the torque limiter 23 limits the driving motor traction control torque (the input value, i.e., torque after application of rate limit) to the obtained torque limit value. Furthermore, the torque limiter 23 may limit the driving motor traction control torque so as not to exceed the driver's requested torque.

Furthermore, the torque limiter 23 may perform torque limit so that the minimum value of the driving motor traction control torque is equal to or greater than the minimum value among the driver's requested torque and predetermined threshold friction torque. The reason for this is to maximize the use of the maximum static frictional force or kinetic frictional force of the road surface.

For example, to use the frictional force of a slippery road surface on which a wheel slips at the initial stage of control (to improve start responsiveness), a lower limit value of the driving motor torque may be set and used as the threshold friction torque.

A value determined through experimentation and evaluation in a vehicle development process may be used as the threshold friction torque. Alternatively, when the coefficient of friction of a slippery road surface may be estimated in real time, a value obtained in real time using the equation of "threshold friction torque=μ×m×g" may be used as the threshold friction torque. Because a process or method of estimating the coefficient of friction of the surface of a road on which a vehicle is traveling is well known, a description thereof will be omitted.

The driving motor torque determination unit 20a includes a final torque command determination unit 24. In the state in which traction control is entered, the final torque command determination unit 24 outputs a command for generating the driving motor traction control torque, to which rate limit and torque limit have been applied after summation of the driver's requested torque, the reduction torque, and the compensation torque, as a final driving motor torque command (step S7).

Meanwhile, when release of traction control is determined or when there is a request for internal and external torque intervention, the final torque command determination unit 24 outputs a driving motor torque command according to internal and external torque intervention of the control unit VCU as a final driving motor torque command, and terminates traction control of the present disclosure (traction control of the present disclosure is terminated after step S6 in FIG. 6).

Next, a process of determining a TV motor torque command will be described with reference to FIG. 11. In an exemplary embodiment of the present disclosure, the TV motor is used to control the speed of a slipping wheel during traction control. The TV motor torque command during traction control is a torque command for controlling the speed of a slipping wheel. In the split-μ situation after entry of traction control, the TV motor supplies braking torque for speed control to a wheel which is located on a slippery road surface.

Furthermore, according to an exemplary embodiment of the present disclosure, a vehicle-model-based disturbance observer (DOB) is used to determine the TV motor torque command, achieving robust speed control performance against disturbance. According to the present method, it is possible to perform robust speed control without direct estimation of disturbance, reducing the number of tuning processes and achieving robust control performance even in various environments that have not been tested.

As shown in FIG. 11, the TV-motor-based wheel speed error $error_{TV}$, which is a slipping wheel speed error, is input to the TV motor torque determination unit 20b, which is configured to determine a TV motor torque command in the controller. According to an exemplary embodiment of the present disclosure, the TV motor torque determination unit 20b of the controller is configured for determining TV motor traction control torque and a TV motor torque command using a method of subtracting observer torque $T_{TV,DOB}$ from the speed control torque.

Here, the speed control torque is determined based on feedforward speed control torque $T_{TV,FF}$ determined by and output from the feedforward controller 25 and feedback speed control torque $T_{TV,FB}$ determined by and output from the feedback controller 26. In the instant case, a value obtained by summing the feedforward speed control torque $T_{TV,FF}$ and the feedback speed control torque $T_{TV,FB}$ may be determined to be the speed control torque.

The feedforward controller 25 of the TV motor torque determination unit 20b is configured for determining and outputting the feedforward speed control torque $T_{TV,FF}$ using the TV-motor-based wheel speed error $error_{TV}$ as an input, and the feedback controller 26 is configured for determining and output the feedback speed control torque $T_{TV,FB}$ using the TV-motor-based wheel speed error $error_{TV}$ as an input.

In the exemplary embodiment of the present disclosure, the feedforward controller 25 of the TV motor torque determination unit 20b may be configured for determining the feedforward speed control torque $T_{TV,FF}$ using the vehicle driving information in addition to the TV-motor-based wheel speed error $error_{TV}$. The vehicle driving information may include actual driving motor torque $T_{Main, act}$.

Here, the actual driving motor torque $T_{Main, act}$ is actual driving motor output torque which may be output in response to a final driving motor torque command output from the driving motor torque determination unit 20a as driving motor traction control torque determined by the driving motor torque determination unit 20a during traction control.

Furthermore, the vehicle driving information used to determine the feedforward speed control torque $T_{TV,FF}$ may further include a vehicle longitudinal acceleration ax, which is information obtained by the acceleration sensor of the driving information detection unit, and a road slope θ.

In the exemplary embodiment of the present disclosure, the feedforward controller 25 of the TV motor torque determination unit 20b may be configured to determine the feedforward speed control torque $T_{TV,FF}$ based on the TV-motor-based wheel speed error $error_{TV}$ and vehicle driving information such as the actual driving motor torque $T_{main,\ act}$, the vehicle longitudinal acceleration ax, and the road slope θ, as shown in Equation 11 below.

$$T_{TV,FF} = \frac{1}{FGR_{TV}}\left(\frac{1}{2}T_{Main,act} \times FGR_{Main} - I_w\text{error}_{TV} - \frac{1}{2}ma_xr - \frac{1}{2}mg\sin\theta r\right) \quad \text{[Equation 11]}$$

Here, $T_{TV,FF}$ represents the feedforward speed control torque, $FGR_{TV}$ represents a TV motor reduction ratio, which is a reduction ratio between the TV motor and the wheel, and $FGR_{Main}$ represents a driving motor reduction ratio, which is a reduction ratio between the driving motor and the wheel.

$T_{Main,\ act}$ represents the actual driving motor torque, and $I_w$ represents the moment of inertia of the slipping wheel. When the slipping wheel is a left wheel, $I_w$ is the moment of inertia of the left wheel, and when the slipping wheel is a right wheel, $I_w$ is the moment of inertia of the right wheel.

$\text{error}_{TV}$ represents the TV-motor-based wheel speed error, m represents the vehicle mass, $a_x$ represents the vehicle longitudinal acceleration, r represents the dynamic radius of a tire, g represents the gravitational acceleration, and θ represents the road slope.

Furthermore, in a process of controlling the speed of the TV motor after entry of traction control, the feedback speed control torque $T_{TV,FB}$ may be determined through PID control based on the wheel speed error to secure control stability.

To the present end, the feedback controller 26 of the TV motor torque determination unit 20b may be configured for determining the feedback speed control torque $T_{TV,FB}$ through PID control based on the TV motor wheel speed error $\text{error}_{TV}$, which is a slipping wheel speed error. In the instant case, the feedback controller 26 may be configured to determine the feedback speed control torque $T_{TV,FB}$ using the TV-motor-based wheel speed error $\text{error}_{TV}$ as an input, as shown in Equation 12 below.

$$T_{TV,FB} = \text{error}_{TV} \times K_p + \int \text{error}_{TV} dt \times K_i + \frac{d}{dt}(\text{error}_{TV}) \times K_d \quad \text{[Equation 12]}$$

Here, $T_{TV,FB}$ represents the feedback speed control torque, $\text{error}_{TV}$ represents the TV-motor-based wheel speed error, which is a slipping wheel speed error, and $K_p$, $K_i$, and $K_d$ represent P gain, I gain, and D gain, respectively. The I-term torque in Equation 12 is reset to 0 when traction control is released.

Referring to Equation 12, it may be seen that the feedback speed control torque $T_{TV,FB}$ is determined through PID control based on the TV-motor-based wheel speed error $\text{error}_{TV}$ to reduce the slipping wheel speed error.

Meanwhile, in the exemplary embodiment of the present disclosure, the TV motor torque determination unit 20b is configured to determine speed control torque by summing the feedforward speed control torque $T_{TV,FF}$ and the feedback speed control torque $T_{TV,FB}$, and is configured to determine TV motor traction control torque using a method of subtracting the observer torque $T_{TV,DOB}$ from the speed control torque.

Referring to FIG. 11, it may be seen that the TV motor traction control torque $T_{TV,In}$ (torque before application of limit) is determined by subtracting the observer torque $T_{TV,DOB}$ from the speed control torque ($T_{TV,FF}+T_{TV,FB}$), which is obtained by summing the feedforward speed control torque $T_{TV,FF}$ and the feedback speed control torque $T_{TV,FB}$.

Furthermore, rate limit and torque limit (saturation) are applied to the determined TV motor traction control torque $T_{TV,In}$ ($T_{TV,In}=T_{TV,FF}+T_{TV,FB}-T_{TV,DOB}$), and a final TV motor torque command is generated and output from the TV motor traction control torque after application of rate limit and torque limit thereto.

That is, the TV motor torque determination unit 20b sequentially apply rate limit and torque limit to the torque $T_{TV,In}$ ($T_{TV,In}=T_{TV,FF}+T_{TV,FB}-T_{TV,DOB}$), which is obtained by subtracting the observer torque $T_{TV,DOB}$ from the speed control torque ($T_{TV,FF}+T_{TV,FB}$), which is obtained by summing the feedforward speed control torque $T_{TV,FF}$ and the feedback speed control torque $T_{TV,FB}$, to determine final TV motor traction control torque (step S10).

Furthermore, the TV motor torque determination unit 20b generates a TV motor torque command corresponding to the determined final TV motor traction control torque value (step S12). As a result, the controller is configured to perform TV motor torque control following the TV motor torque command (step S13).

To the present end, the TV motor torque determination unit 20b includes a rate limiter 27 and a torque limiter 28. The rate limiter 27 limits the rate of the torque value $T_{TV,In}$ obtained by subtracting the observer torque from the speed control torque (the TV motor traction control torque value before application of limit) to a rate value according to the vehicle driving mode. The output value from the rate limiter 27, i.e., the torque value after application of rate limit, is input to the torque limiter 28.

The torque limiter 28 is configured to perform torque limit (saturation) according to the torque-speed (T-N) graph of the TV motor with respect to the input value (the TV motor traction control torque value before application of torque limit).

That is, when the maximum torque value of the TV motor corresponding to the TV motor speed detected by the sensor (the resolver) is obtained from the torque-speed graph, the torque limiter 28 is configured to determine the obtained maximum torque of the TV motor to be a torque limit value, and limits the TV motor traction control torque (the input value, i.e., torque after application of rate limit) to the determined torque limit value (the maximum torque value of the TV motor).

As described above, the TV motor traction control torque may be limited to the TV motor maximum torque obtained from the torque-speed graph. The purpose of torque limit is to secure control stability by limiting the TV motor torque because the road surfaces on which two opposite wheels are located are slippery.

The TV motor torque determination unit 20b includes a final torque command determination unit 29. In the state in which traction control is entered, the final torque command determination unit 29 outputs a command for generating the TV motor traction control torque, to which rate limit and torque limit have been applied after subtraction of the observer torque from the speed control torque, as a final TV motor torque command (step S12).

Meanwhile, when release of traction control is determined or when there is a request for internal and external torque intervention, the final torque command determination unit 29 outputs a TV motor torque command according to internal and external torque intervention of the control unit VCU as a final TV motor torque command, and terminates traction control of the present disclosure (traction control of the present disclosure is terminated after step S11 in FIG. 6).

In FIG. 11, "vehicle plant" represents an actual vehicle plant, which may be referred to as an actual vehicle. The vehicle plant may be a driving system of an actual vehicle, which includes a driving motor, a TV motor, and wheels.

As shown in FIG. 11, the TV motor torque command output from the final torque command determination unit 29 of the TV motor torque determination unit 20b is transmitted to the vehicle plant 30, and the operation of the TV motor in the vehicle plant (the actual vehicle driving system) 30 is controlled in response to the TV motor torque command.

In FIG. 11, "d" indicates a state in which actual disturbance, such as the coefficient of friction of a road surface or crosswind, is applied to a vehicle which is traveling. In an exemplary embodiment of the present disclosure, because the TV motor traction control torque from which the disturbance applied to the vehicle is removed is used, robust control performance may be secured.

In an exemplary embodiment of the present disclosure, the disturbance observer 31 receives a current slipping wheel speed $V_{wheel,max}$ (where "$V_{wheel}$" represents a wheel speed) as feedback information from the vehicle plant 30, and a nominal plant 32 of the disturbance observer 31 is configured to determine and outputs plant torque $T_{plant}$ corresponding to the current slipping wheel speed $V_{wheel,max}$.

In the instant case, a larger value among the left wheel speed and the right wheel speed is the slipping wheel speed (the slipping wheel actual speed), and the left wheel speed and the right wheel speed are information that the vehicle plant 30 obtains through a sensor.

Furthermore, a difference between the plant torque $T_{plant}$ and the actual TV motor torque $T_{actual}$ becomes disturbance of the actual vehicle, and the disturbance observer 31 is configured to determine the difference between the plant torque $T_{plant}$ and the actual TV motor torque $T_{actual}$ to be the observer torque $T_{TV,DOB}$, and outputs the observer torque $T_{TV,DOB}$.

Hereinafter, the disturbance observer and a process of determining, by the disturbance observer, the observer torque will be described in detail.

As described above, the TV motor traction control torque $T_{TV,In}$ before rate limit and torque limit (saturation) is determined to be a value obtained by subtracting the observer torque $T_{TV,DOB}$ from the speed control torque. Here, the speed control torque is determined to be a sum ($T_{TV,FF}+T_{TV,FB}$) of the feedforward speed control torque $T_{TV,FF}$ and the feedback speed control torque $T_{TV,FB}$.

In an exemplary embodiment of the present disclosure, the observer torque $T_{TV,DOB}$ is an output of the disturbance observer (DOB), and the disturbance observer 31 includes a nominal plant 32.

In an exemplary embodiment of the present disclosure, the disturbance observer (DOB) 31 is configured for determining the observer torque $T_{TV,DOB}$ for determining the TV motor torque command applied to the vehicle plant 30 using feedback information that the vehicle plant 30 obtains in real time.

Among the entire control processes, the process performed by the disturbance observer 31 may correspond to inner-loop control logic, which is distinguished from the remaining control processes, which correspond to outer-loop control logic, as shown in FIG. 11.

In an exemplary embodiment of the present disclosure, the nominal plant 32 of the disturbance observer 31 may be referred to as a dynamic vehicle plant. It may be assumed that the nominal plant 32 is a theoretically ideal vehicle plant. The nominal plant 32 receives real-time vehicle driving information obtained by the vehicle plant (the actual vehicle driving system) as an input, and outputs plant torque $T_{plant}$ based thereon.

The vehicle driving information that the nominal plant 32 utilizes to determine the plant torque $T_{plant}$ may include wheel speed information detected by a wheel speed sensor included in the driving information detection unit.

In an exemplary embodiment of the present disclosure, the wheel speed information which is input to the nominal plant 32 includes the slipping wheel actual speed $w_{slip}$ (=$V_{wheel,max}$), which is the speed of a wheel which is actually slipping. This wheel speed information is feedback information from the vehicle plant 30. As described with reference to FIG. 9, the slipping wheel actual speed $w_{slip}$ is also used to determine the TV-motor-based wheel speed error $error_{TV}$. The slipping wheel actual speed $w_{slip}$ is a larger value among the left wheel speed (the rotation speed of the left wheel) and the right wheel speed (the rotation speed of the right wheel).

The slipping state of the wheel may be expressed using a plant model equation based on wheel dynamics, as shown in Equation 13 below. Equation 13 below may be used to obtain a model equation of the nominal plant 32 for determining the plant torque $T_{plant}$.

$$w_{slip}^{\cdot} = \frac{1}{I_w}\left(\frac{1}{2}T_{Main,act} \times FGR_{Main} - \right. \qquad \text{[Equation 13]}$$
$$\left. T_{TV} \times FGR_{TV} - \frac{1}{2}\text{mgsin}\theta r - \frac{1}{2}ma_x r - \frac{1}{2}rd_d + d_w\right)$$

Equation 14 below is a model equation of the nominal plant 32 in the exemplary embodiment of the present disclosure, which enables the nominal plant 32 to determine the plant torque $T_{plant}$ using vehicle driving information.

$$T_{plant} = \qquad \text{[Equation 14]}$$
$$\frac{1}{FGR_{TV}}\left(\frac{1}{2}T_{Main,act} \times FGR_{Main} - I_w w_{slip}^{\cdot} - \frac{1}{2}ma_x r - \frac{1}{2}\text{mgsin}\theta r\right)$$

In Equations 13 and 14, $T_{plant}$ represents the plant torque, $FGR_{TV}$ represents a TV motor reduction ratio, which is a reduction ratio between the TV motor and the wheel, and $FGR_{Main}$ represents a driving motor reduction ratio, which is a reduction ratio between the driving motor and the wheel.

As described with reference to Equation 11, in Equations 13 and 14 above, $T_{Main}$, act represents the actual driving motor torque, $I_w$ represents the moment of inertia of the slipping wheel, m represents the vehicle mass, $a_x$ represents the vehicle longitudinal acceleration, r represents the dynamic radius of a tire, g represents the gravitational acceleration, and θ represents the road slope.

Furthermore, in Equations 13 and 14, $w^*_{slip}$ represents the angular acceleration of the slipping wheel obtained by differentiating the slipping wheel actual speed. $w^*_{slip}$ is information obtained by differentiating a signal from the wheel speed sensor mounted on the slipping wheel. When the slipping wheel is a left wheel, $w^*_{slip}$ is the angular acceleration of the left wheel, and when the slipping wheel is a right wheel, $w^*_{slip}$ is the angular acceleration of the right wheel.

In Equation 13, da represents disturbance applied to the side surface of the vehicle. Furthermore, in Equation 13, $d_w$ represents disturbance applied to the side surface of a wheel. $d_w$ is disturbance applied to a wheel (a grounded wheel that does not slip) located opposite a wheel which is slipping (a slipping wheel). For example, when the right wheel is a slipping wheel which is slipping, $d_w$ is disturbance applied to the side surface of the left wheel, which is a grounded wheel.

Torque control is performed on the driving motor to satisfy the driver's intention. However, speed control reflecting the observer torque $T_{TV,DOB}$ needs to be performed on the TV motor to compensate for the disturbance applied to the side surface of a wheel which is slipping (a slipping wheel).

In relation to the feedforward torque for speed control of the TV motor in an exemplary embodiment of the present disclosure, because $$-\frac{1}{2}rd_d + d_{w_n},$$

which is an unknown disturbance part in Equation 13, is not known, it is assumed that the remaining part in Equation 13 is the nominal plant, and the TV motor torque necessary therefor is determined using Equation 14, and is applied as the feedforward torque.

The unknown disturbance part includes a disturbance component applied to the side surface of the vehicle and a disturbance component applied to the side surface of a wheel. In an exemplary embodiment of the present disclosure, the disturbance observer (DOB) 31 is used to compensate for the present unknown disturbance.

According to Equation 14, the nominal plant 32 utilizes the actual driving motor torque $T_{Main, act}$, which is one of the vehicle driving information, to determine the plant torque $T_{plant}$. Furthermore, the nominal plant 32 further utilizes the vehicle longitudinal acceleration $a_x$ and the road slope $\theta$, obtained by the acceleration sensor of the driving information detection unit, as well as the above-described slipping wheel actual speed $\omega_{slip}$.

Furthermore, it may be seen from Equation 14 that the TV-motor-based wheel speed error $error_{TV}$ in Equation 11 is substituted with the slipping wheel angular acceleration $w^*_{slip}$.

As described above, in an exemplary embodiment of the present disclosure, the disturbance observer (DOB) 31 of the controller may be configured to determine the plant torque $T_{plant}$ for compensating for unknown disturbance using the model equation shown in Equation 14, which is derived from a plant model based on wheel dynamics.

Furthermore, in the exemplary embodiment of the present disclosure, the disturbance observer 31 receives the actual TV motor torque ($T_{TV,Out}=T_{TV}=T_{actual}$) from the vehicle plant 30, and utilizes the same as another variable for determining the observer torque $T_{TV,DOB}$. The observer torque $T_{TV,DOB}$ may be determined to be a value obtained by subtracting the actual TV motor torque from the plant torque.

Here, the actual TV motor torque is TV motor traction control torque determined by the TV motor torque determination unit 20b in the preceding control period during traction control. The actual TV motor torque is actual TV motor output torque which may be output in response to a final TV motor torque command output to the vehicle plant from the TV motor torque determination unit 20b in the preceding control period.

Furthermore, when the observer torque is determined as described above, a filter, e.g., a low-pass filter (LPF), may be used. That is, as shown in FIG. 11, the observer torque $T_{TV,DOB}$ may be determined to be a difference between a value $T_{plant}$ obtained by applying a filter 33 to an output from the nominal plant and a value $T_{actual}$ obtained by applying a filter 34 to the actual TV motor torque $T_{TV,Out}$ output from the vehicle plant 30.

The traction control process according to an exemplary embodiment of the present disclosure has been described above in detail, and the effects of the present disclosure will be briefly described with reference to FIG. 7.

Even if a vehicle is optimally tuned in a specific test environment in the development stage, it is difficult to guarantee optimal performance for speed control in practice due to disturbance generated in an actual environment (e.g., changes in the coefficient of friction of a road surface or changes in the performance of a tire due to abrasion). Therefore, generally, tuning is performed in consideration of a margin for unexpected environment variables. Thus, performance tuning is conservatively performed.

In contrast, in an exemplary embodiment of the present disclosure, the feedforward speed control torque, the feedback speed control torque, and the observer torque are determined based on a vehicle model. Accordingly, if system parameters are appropriately set according to a vehicle model, the observer torque compensates for disturbance generated in the current driving environment. As a result, it is possible to ensure stable and optimal speed control performance in all environments.

As is apparent from the above description, according to the traction control method for a vehicle according to an exemplary embodiment of the present disclosure, when a vehicle provided with a torque vectoring apparatus is in a split-µ situation, braking torque generated by the torque vectoring motor is applied to a wheel which is located on a slippery road surface so that reactive torque is supplied to a grounded wheel. Accordingly, because additional driving force equivalent to the braking torque is separately supplied to the grounded wheel, the vehicle may effectively escape from the split-µ situation without loss of total driving force transmitted to the wheels.

Furthermore, according to an exemplary embodiment of the present disclosure, because the speed of the torque vectoring motor is controlled, the start responsiveness and start linearity of the vehicle may be improved compared to traction control using a conventional hydraulic braking device (a conventional friction braking device) in a split-µ situation.

Furthermore, according to an exemplary embodiment of the present disclosure, because braking torque, which is torque acting in a direction opposite to the acting direction of the driving torque of the driving motor, is applied to a slipping wheel by the torque vectoring motor, it is possible to reduce the amount of torque of a conventional hydraulic braking device, improving the durability of the hydraulic braking device. Furthermore, because the torque vectoring motor operates in a regenerative braking region during traction control in a split-µ situation, the efficiency of use of electricity may be improved.

Furthermore, according to an exemplary embodiment of the present disclosure, it is possible to perform robust speed control without direct estimation of disturbance, reducing the number of tests and the number of tuning processes and achieving robust control performance even in various environments that have not been tested.

Furthermore, the term related to a control device such as "controller", "control apparatus", "control unit", "control device", "control module", or "server", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present disclosure. The control device according to exemplary embodiments of the present disclosure may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may be configured to process data according to a program provided from the memory, and may be configured to generate a control signal according to the processing result.

The control device may be at least one microprocessor operated by a predetermined program which may include a series of commands for carrying out the method included in the aforementioned various exemplary embodiments of the present disclosure.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the scope of the present disclosure includes software or machine-executable commands (e.g., an operating system, an application, firmware, a program, etc.) for enabling operations according to the methods of various embodiments to be executed on an apparatus or a computer, a non-transitory computer-readable medium including such software or commands stored thereon and executable on the apparatus or the computer.

In various exemplary embodiments of the present disclosure, the control device may be implemented in a form of hardware or software, or may be implemented in a combination of hardware and software.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A traction control method for a vehicle, the method comprising:
    estimating, by a controller, a wheel speed based on a rotation speed of a vehicle driving system or a vehicle acceleration detected by an acceleration sensor and determining a slipping wheel target speed based on the estimated wheel speed in a state in which traction control is entered in the vehicle provided with a torque vectoring motor;
    determining, by the controller, a wheel speed error based on the determined slipping wheel target speed and a slipping wheel actual speed detected by a wheel speed sensor and determining motor-based wheel speed errors based on the determined wheel speed error;
    determining, by the controller, motor traction control torque based on the determined motor-based wheel speed errors and driver's requested torque; and
    controlling, by the controller, a driving motor to drive the vehicle and the torque vectoring motor based on the determined motor traction control torque,
    wherein the determining of the motor traction control torque includes:
    determining, by a disturbance observer based on a vehicle model, observer torque based on the slipping wheel actual speed and a torque vectoring motor torque, the slipping wheel actual speed and the torque vectoring motor torque being feedback information obtained from the vehicle in which the driving motor and the torque vectoring motor are controlled; and
    determining a torque vectoring motor traction control torque based on the determined observer torque and a speed control torque determined based on a torque-vectoring-motor-based wheel speed error among the determined motor-based wheel speed errors.

2. The traction control method of claim 1,
wherein the motor-based wheel speed errors include a driving-motor-based wheel speed error and the torque-vectoring-motor-based wheel speed error, and
wherein, in a process of determining the motor-based wheel speed errors, the controller is configured for determining a difference between the slipping wheel target speed and the slipping wheel actual speed to be a base wheel speed error, and is configured to determine the driving-motor-based wheel speed error and the torque-vectoring-motor-based wheel speed error by multiplying the determined base wheel speed error by factor values reflecting hardware characteristics of respective motors.

3. The traction control method of claim 2, wherein, in the controller, a factor value reflecting hardware characteristics of the driving motor among the factor values reflecting the hardware characteristics of the respective motors is determined to be +1 when a gear stage state of the vehicle corresponds to a D range, and is determined to be −1 when the gear stage state of the vehicle corresponds to an R range.

4. The traction control method of claim 2, wherein, in the controller, a factor value reflecting hardware characteristics of the torque vectoring motor among the factor values reflecting the hardware characteristics of the respective motors is determined to be +1 when a gear stage state of the vehicle corresponds to a D range and a left wheel of the vehicle slips, is determined to be −1 when the gear stage state of the vehicle corresponds to the D range and a right wheel of the vehicle slips, is determined to be −1 when the gear stage state of the vehicle corresponds to an R range and the left wheel slips, and is determined to be +1 when the gear stage state of the vehicle corresponds to the R range and the right wheel slips.

5. The traction control method of claim 1,
wherein the determining of the motor traction control torque further includes determining a driving motor traction control torque to control the driving motor,
wherein the driving motor traction control torque is determined to be a value obtained by adding reduction torque and compensation torque to the driver's requested torque,
wherein the reduction torque is determined based on the driver's requested torque and a driving-motor-based wheel speed error among the motor-based wheel speed errors, and
wherein the compensation torque is determined to be a value obtained according to the driver's requested torque.

6. The traction control method of claim 5, wherein the reduction torque is determined to be a value obtained by summing feedforward reduction torque, determined based on the driver's requested torque and an actual torque vectoring motor torque, and a feedback reduction torque, determined through PID control based on the driving-motor-based wheel speed error.

7. The traction control method of claim 6, wherein the feedforward reduction torque is determined using Equation E1 below:

feedforward reduction torque=−1×(|driver's requested torque|−2×|actual torque vectoring motor torque|)×$K_f$      E1:

where "||" represents an absolute value, and $K_f$ represents a factor value reflecting hardware characteristics of the driving motor, and wherein, when a gear stage state of the vehicle corresponds to a D range, $K_f$ is +1, and when the gear stage state of the vehicle corresponds to an R range, $K_f$ is −1.

8. The traction control method of claim 6, wherein, when a grounded wheel located opposite a slipping wheel among a left wheel and a right wheel of the vehicle slips, a corrected driving-motor-based wheel speed error is determined to be a value obtained by adding "(grounded wheel target speed−grounded wheel actual speed)" to the driving-motor-based wheel speed error, and the feedback reduction torque is determined through PID control based on the determined corrected driving-motor-based wheel speed error.

9. The traction control method of claim 5, wherein the compensation torque is determined using a map based on the driver's requested torque and an actual torque vectoring motor torque.

10. The traction control method of claim 9, wherein, in the map, the compensation torque is set to a larger value as the driver's requested torque increases, and is set to a smaller value as the actual torque vectoring motor torque increases.

11. The traction control method of claim 1, wherein, in the determining of the motor traction control torque, the speed control torque is determined to be a value obtained by summing feedforward speed control torque, determined using the torque-vectoring-motor-based wheel speed error and vehicle driving information, and feedback speed control torque, determined through PID control based on the torque-vectoring-motor-based wheel speed error.

12. The traction control method of claim 11, wherein the vehicle driving information includes a driving motor torque, a vehicle longitudinal acceleration, and a road slope, the vehicle longitudinal acceleration and the road slope being information obtained by a sensor.

13. The traction control method of claim 12, wherein the driving motor torque among the vehicle driving information is a driving motor traction control torque among the determined motor traction control torque, and is a final driving motor torque command value controlling the driving motor.

14. The traction control method of claim 12, wherein the feedforward speed control torque is determined using Equation E2 below:

$$T_{TV,FF} = \frac{1}{FGR_{TV}}\left(\frac{1}{2}T_{Main,act} \times FGR_{Main} - I_w \text{error}_{TV} - \frac{1}{2}m a_x r - \frac{1}{2}mg\sin\theta r\right) \quad E2$$

where $T_{TV,FF}$ represents the feedforward speed control torque, $FGR_{TV}$ represents a torque vectoring motor reduction ratio between the torque vectoring motor and a wheel, $FGR_{Main}$ represents a driving motor reduction ratio between the driving motor and a wheel, $T_{Main, act}$ represents the driving motor torque, $I_w$ represents a moment of inertia of a slipping wheel, $\text{error}_{TV}$ represents the torque-vectoring-motor-based wheel speed error, m represents a vehicle mass, $a_x$ represents the vehicle longitudinal acceleration, r represents a dynamic radius of a tire, g represents a gravitational acceleration, and θ represents the road slope.

15. The traction control method of claim 1, wherein, in the determining of the observer torque, the torque vectoring motor torque determining the observer torque is the torque vectoring motor traction control torque determined in a preceding control period, and is a final torque vectoring motor torque command value controlling the torque vectoring motor in the preceding control period.

16. The traction control method of claim 1, wherein, in the determining of the observer torque, the observer torque is determined by subtracting the torque vectoring motor torque from a plant torque determined through a nominal plant receiving the slipping wheel actual speed as an input thereof.

17. The traction control method of claim 16, wherein, in the nominal plant, the plant torque is determined using a model equation including the slipping wheel actual speed, a driving motor torque, a vehicle longitudinal acceleration, and a road slope as inputs thereof, the vehicle longitudinal acceleration and the road slope being information obtained by a sensor.

18. The traction control method of claim 17, wherein the plant torque is determined using the model equation of the nominal plant, the model equation of the nominal plant being expressed using Equation E3 below:

$$T_{plant} = \frac{1}{FGR_{TV}}\left(\frac{1}{2}T_{Main,act} \times FGR_{Main} - I_w w^*_{slip} - \frac{1}{2}m a_x r - \frac{1}{2}mg\sin\theta r\right) \quad \text{E3}$$

where $T_{plant}$ represents the plant torque, $FGR_{TV}$ represents a torque vectoring motor reduction ratio between the torque vectoring motor and a wheel, $FGR_{Main}$ represents a driving motor reduction ratio between the driving motor and a wheel, $T_{Main,\ act}$ represents the driving motor torque, $I_w$ represents a moment of inertia of a slipping wheel, $w^*_{slip}$ represents a slipping wheel angular acceleration obtained by differentiating the slipping wheel actual speed, m represents a vehicle mass, $a_x$ represents the vehicle longitudinal acceleration, r represents a dynamic radius of a tire, g represents a gravitational acceleration, and θ represents the road slope.

19. The traction control method of claim 16, wherein the observer torque is determined by subtracting a value obtained by applying a low-pass filter to the torque vectoring motor torque from a value obtained by applying another low-pass filter to the plant torque.

20. The traction control method of claim 1, wherein, in the determining of the torque vectoring motor traction control torque, the torque vectoring motor traction control torque is determined by subtracting the observer torque from the speed control torque determined based on the torque-vectoring-motor-based wheel speed error.

* * * * *